(12) United States Patent
Dutta

(10) Patent No.: US 12,126,528 B2
(45) Date of Patent: Oct. 22, 2024

(54) EGRESS REROUTING OF PACKETS AT A COMMUNICATION DEVICE

(71) Applicant: Nokia Solutions and Networks Oy, Espoo (FI)

(72) Inventor: Pranjal Kumar Dutta, Sunnyvale, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 18/189,295

(22) Filed: Mar. 24, 2023

(65) Prior Publication Data
US 2024/0323118 A1  Sep. 26, 2024

(51) Int. Cl.
H04L 45/00 (2022.01)
(52) U.S. Cl.
CPC ............ H04L 45/566 (2013.01); H04L 45/22 (2013.01)
(58) Field of Classification Search
CPC ................................................ H04L 45/00–851
See application file for complete search history.

(56) References Cited

U.S. PATENT DOCUMENTS

| | | | | |
|---|---|---|---|---|
| 7,254,138 B2* | 8/2007 | Sandstrom | ............... | H04L 45/24 370/252 |
| 7,352,745 B2* | 4/2008 | Perera | ................. | H04L 49/3009 370/389 |
| 7,428,209 B1* | 9/2008 | Roberts | ................... | H04L 45/10 370/248 |
| 7,787,469 B2* | 8/2010 | Sharma | ................. | H04L 47/724 370/468 |
| 8,014,317 B1* | 9/2011 | Ghosh | ................. | H04L 12/4633 370/254 |
| 9,729,473 B2 | 8/2017 | Haramaty et al. | | |
| 9,781,030 B1* | 10/2017 | Torvi | ...................... | H04L 49/25 |
| 11,063,870 B2* | 7/2021 | Dale | ..................... | H04L 45/748 |
| 2006/0153193 A1* | 7/2006 | Kim | ........................ | H04L 45/28 370/392 |
| 2012/0069745 A1* | 3/2012 | Kini | ........................ | H04L 45/28 370/395.5 |
| 2012/0127996 A1* | 5/2012 | Grosser | ................. | H04L 45/745 370/392 |
| 2014/0092738 A1* | 4/2014 | Grandhi | ................ | H04W 28/02 370/235 |
| 2015/0016242 A1* | 1/2015 | Ernstrom | .............. | H04L 45/122 370/218 |

(Continued)

OTHER PUBLICATIONS

Extended European Search Report in corresponding EP Patent Application No. 24162479.0-1215, dated Jul. 18, 2024, 8 pages.

*Primary Examiner* — Brendan Y Higa
(74) *Attorney, Agent, or Firm* — Tong, Rea, Bentley & Kim, LLC

(57) ABSTRACT

Various example embodiments for supporting egress rerouting of data packets in communication devices are presented herein. The egress rerouting of a data packet in a communication device may be performed by rerouting a data packet received via an ingress forwarding element of the communication device from a first egress forwarding element of the communication device associated with a primary next-hop for the data packet to a second egress forwarding element of the communication device associated with a secondary next-hop for the data packet.

20 Claims, 36 Drawing Sheets

(56) References Cited

U.S. PATENT DOCUMENTS

| | | | |
|---|---|---|---|
| 2015/0023173 A1* | 1/2015 | Sharma | H04L 47/122 370/236 |
| 2015/0036684 A1* | 2/2015 | Modi | H04L 45/28 370/389 |
| 2015/0103671 A1* | 4/2015 | Ernstrom | H04L 45/28 370/238 |
| 2015/0188815 A1* | 7/2015 | Liu | H04L 45/741 370/392 |
| 2016/0156546 A1* | 6/2016 | Ceccarelli | H04Q 11/0066 398/52 |
| 2017/0331740 A1* | 11/2017 | Levy | H04L 47/12 |
| 2018/0367438 A9 | 12/2018 | Liang et al. | |
| 2019/0052552 A1* | 2/2019 | Holbrook | H04L 43/50 |
| 2019/0222514 A1* | 7/2019 | Nimmagadda | H04L 45/22 |
| 2019/0363975 A1* | 11/2019 | Djernaes | H04L 45/18 |
| 2020/0007382 A1* | 1/2020 | Xu | H04L 41/0659 |
| 2021/0014155 A1* | 1/2021 | Punj | H04L 45/745 |
| 2021/0058316 A1* | 2/2021 | Kommula | H04L 45/14 |
| 2021/0297345 A1* | 9/2021 | Sawyer | H04L 49/3009 |
| 2021/0409321 A1* | 12/2021 | Li | H04L 45/34 |
| 2022/0353174 A1* | 11/2022 | Kfir | H04L 45/22 |
| 2023/0024814 A1* | 1/2023 | Wang | H04L 45/02 |
| 2023/0164620 A1* | 5/2023 | Lee | H04W 28/0284 |
| 2023/0247523 A1* | 8/2023 | Yi | H04W 40/22 |
| 2023/0308394 A1* | 9/2023 | Chen | H04L 47/125 |
| 2024/0056383 A1* | 2/2024 | Geng | H04L 45/16 |

* cited by examiner

FIG. 6B

IPv4 ROUTE TABLE 602

| ROUTE PREFIX | PRIMARY NEXT-HOP | | SECONDARY NEXT-HOP | |
|---|---|---|---|---|
| | NEXT-HOP ADDRESS | NEXT-HOP INTERFACE | NEXT-HOP ADDRESS | NEXT-HOP INTERFACE |
| ../.. | ../.. | ../.. | ../.. | ../.. |
| 138.12.1.0/24 | 10.10.10.2 | CARD 2, PORT 15 | 20.20.20.2 | CARD N, PORT 11 |
| ../.. | ../.. | ../.. | ../.. | ../.. |
| ../.. | ../.. | ../.. | ../.. | ../.. |

*FIG. 6D*

IPv4 NEXT-HOP TABLE 604

| NEXT-HOP ADDRESS | NEXT-HOP MAC ADDRESS | NEXT-HOP PORT |
|---|---|---|
| ./././ | ./././ | ./././ |
| 10.10.10.2 | 0x0b:0x01:0x02:0x03:x04:0x05 | PORT 15, VLAN 200 |
| ./././ | ./././ | ./././ |

*FIG. 9B*

IPv4 ROUTE TABLE 902

| ROUTE PREFIX | PRIMARY NEXT-HOP | | SECONDARY NEXT-HOP | |
|---|---|---|---|---|
| | NEXT-HOP ADDRESS | NEXT-HOP INTERFACE | NEXT-HOP ADDRESS | NEXT-HOP INTERFACE |
| ../.. | ../.. | ../.. | ../.. | ../.. |
| 138.12.1.0/24 | 10.10.10.2 | CARD 2, PORT 15 | 20.20.20.2 | CARD N, PORT 11 |
| ../.. | ../.. | ../.. | ../.. | ../.. |
| ../.. | ../.. | ../.. | ../.. | ../.. |

SWITCH FABRIC PACKET 903

SWITCH FABRIC PACKET 904

*FIG. 9E*

IPv4 NEXT-HOP TABLE 905

| NEXT-HOP ADDRESS | NEXT-HOP MAC ADDRESS | NEXT-HOP PORT |
|---|---|---|
| ./././ | ./././ | ./././ |
| 20.20.20.2 | 0x0b:0x01:0x02:0x03:x04:0x05 | PORT 11, VLAN 400 |
| ./././ | ./././ | ./././ |

*FIG. 11B*

IPv4 ROUTE TABLE 1102

| ROUTE PREFIX | PRIMARY NEXT-HOP | | SECONDARY NEXT-HOP | |
|---|---|---|---|---|
| | NEXT-HOP ADDRESS | NEXT-HOP INTERFACE | NEXT-HOP ADDRESS | NEXT-HOP INTERFACE |
| . . . | . . . | . . . | . . . | . . . |
| 138.12.1.0/24 | 10.10.10.2 | CARD 2, PORT 15 | 20.20.20.2 | CARD N, PORT 11 |
| . . . | . . . | . . . | . . . | . . . |
| . . . | . . . | . . . | . . . | . . . |

SWITCH FABRIC PACKET 1103

*FIG. 11D*

IPv4
NEXT-HOP
TABLE
1104

| NEXT-HOP ADDRESS | NEXT-HOP MAC ADDRESS | NEXT-HOP PORT |
|---|---|---|
| ./././ | ./././ | ./././ |
| 20.20.20.2 | 0x0b:0x01:0x02:0x03:x04:0x05: | PORT 11, VLAN 400 |
| ./././ | ./././ | ./././ |

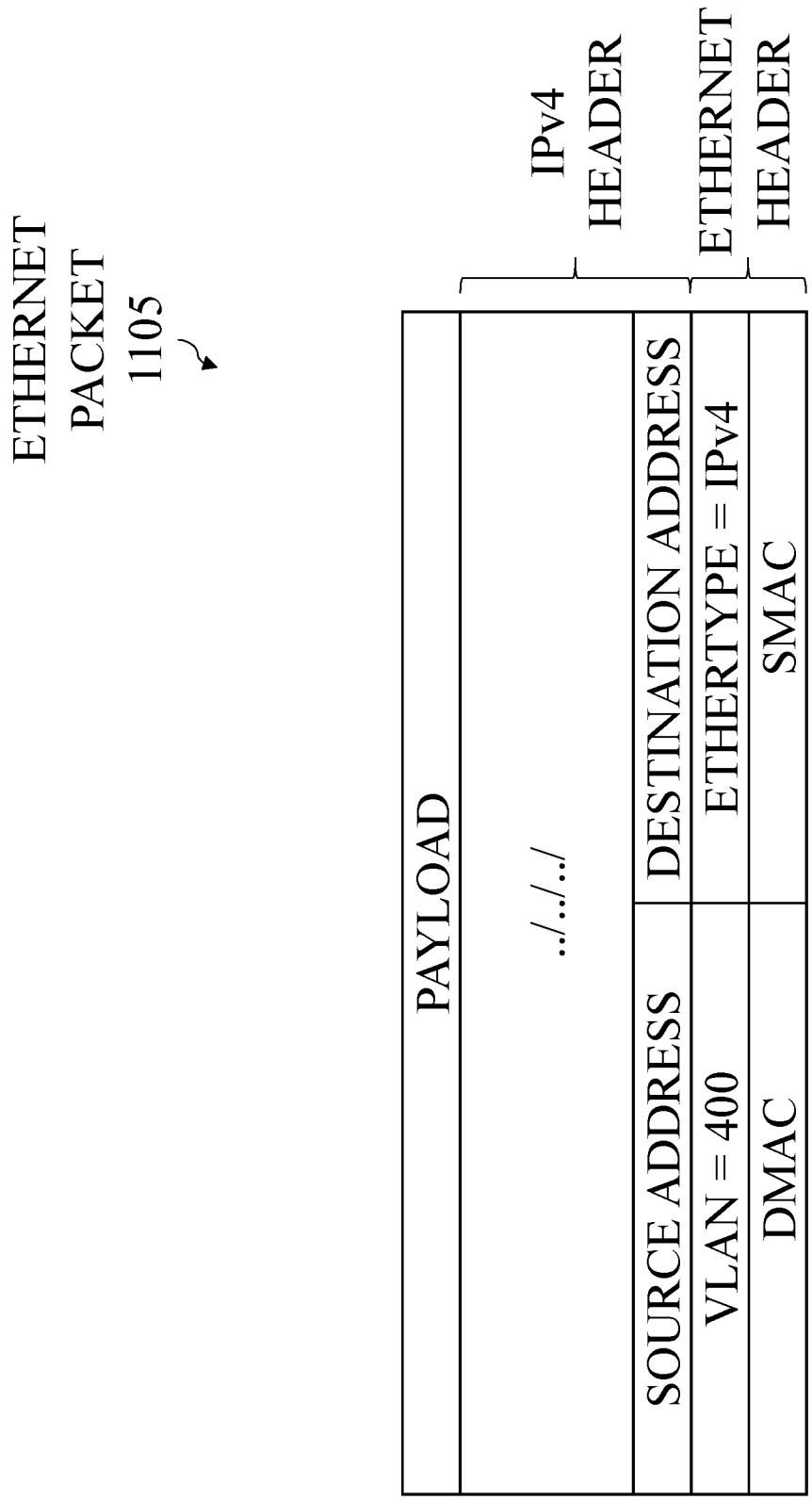

*FIG. 13 CON'T*
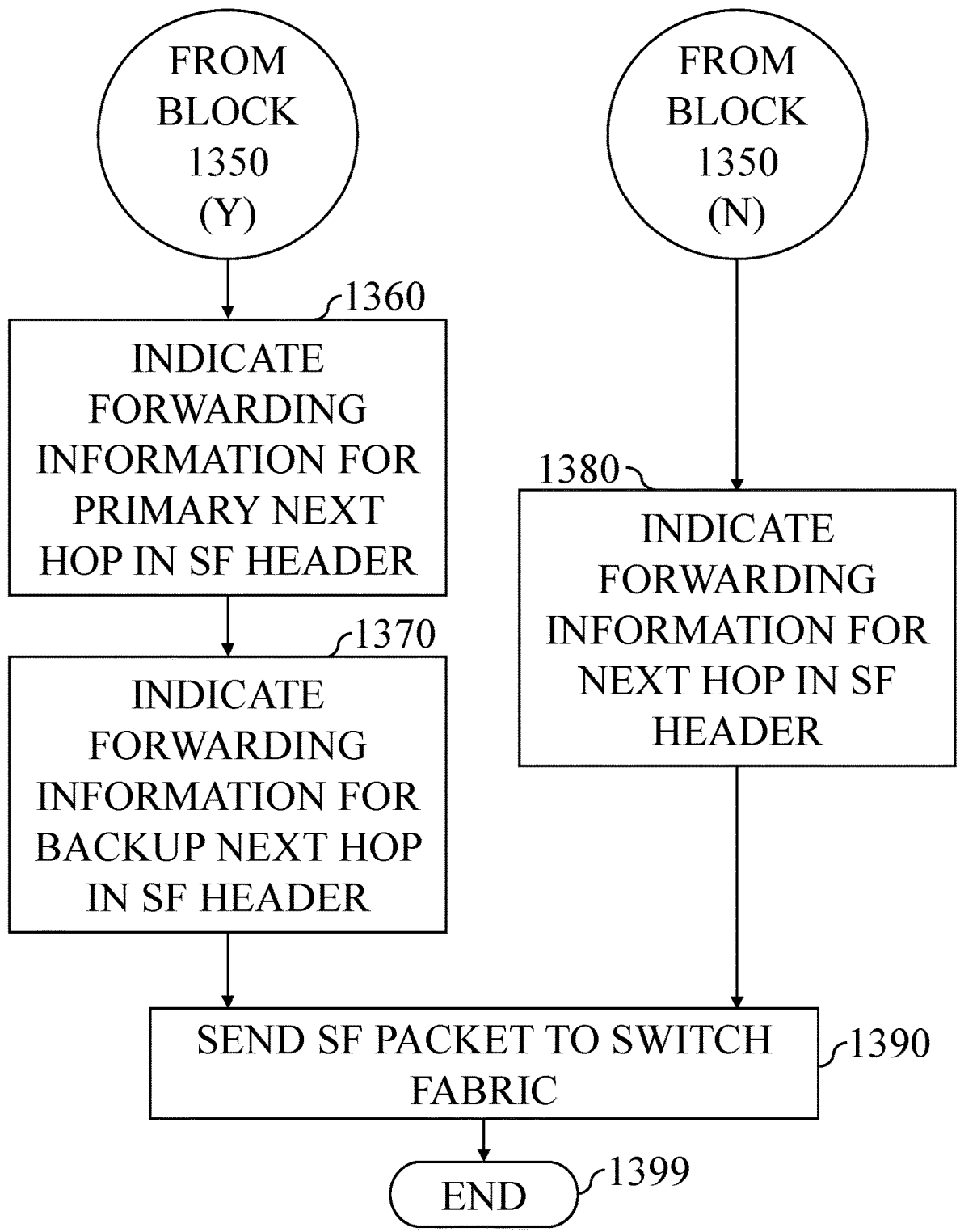

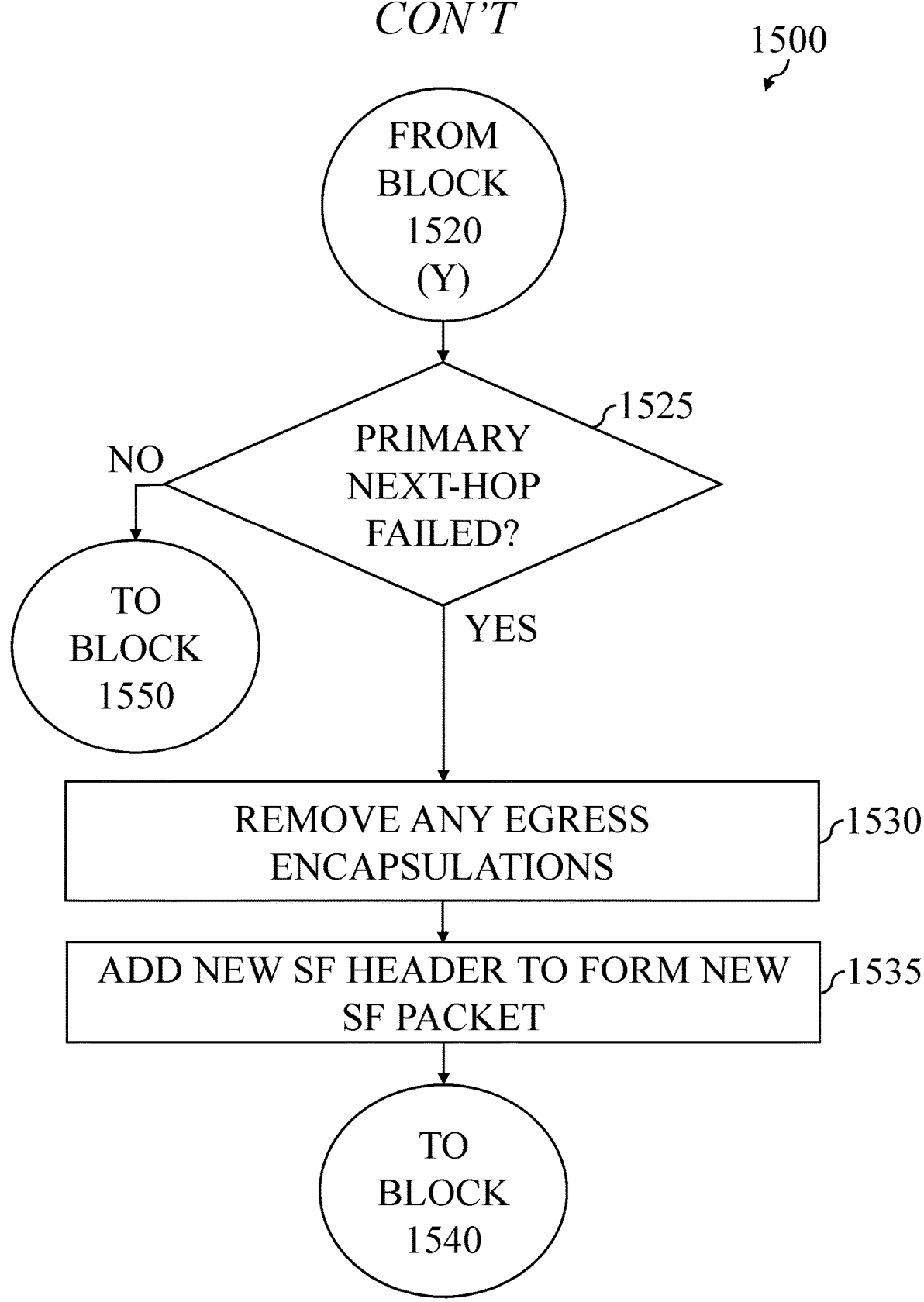
FIG. 15 CON'T

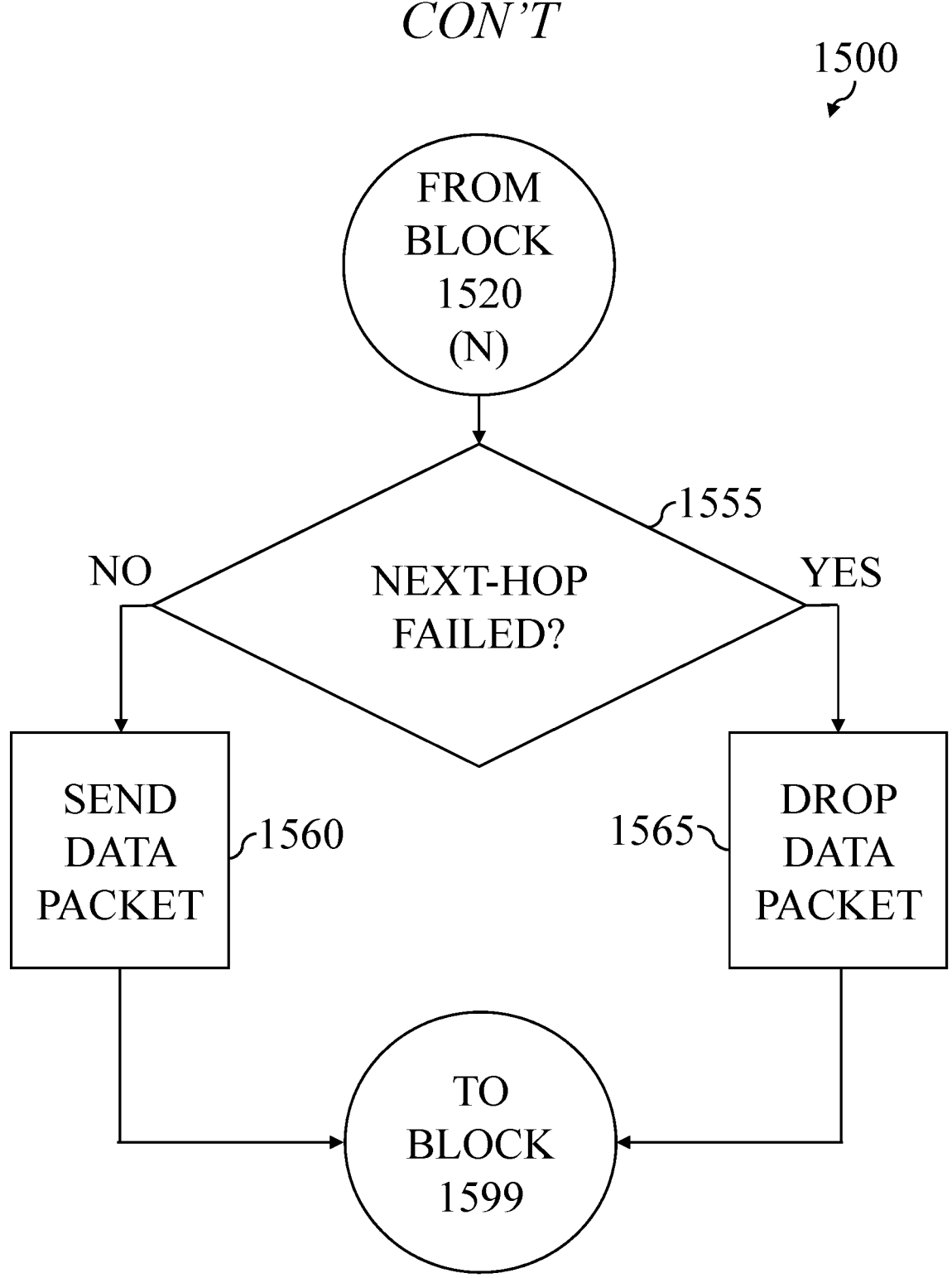
FIG. 15 CON'T

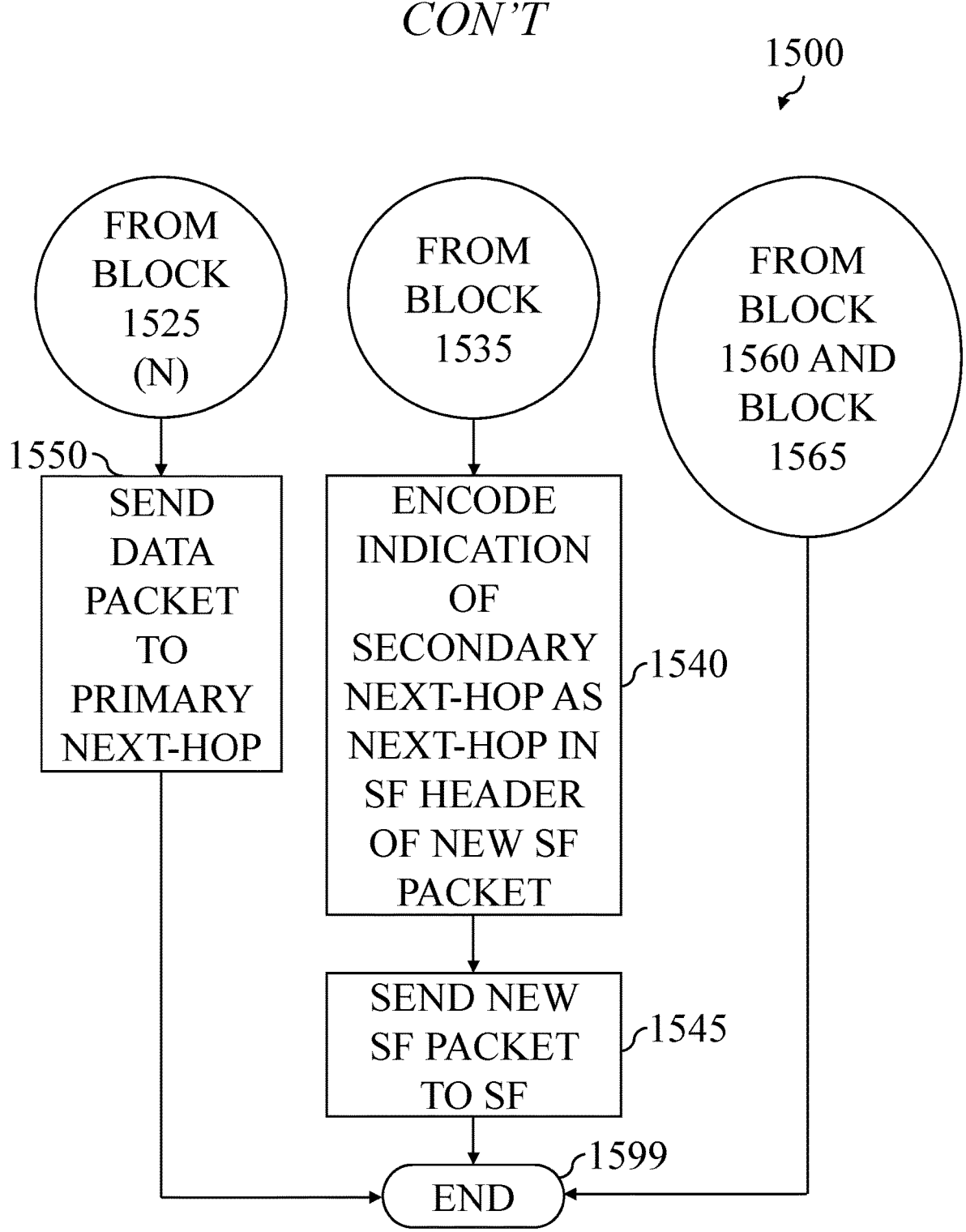
FIG. 15 CON'T

EGRESS REROUTING OF PACKETS AT A COMMUNICATION DEVICE

TECHNICAL FIELD

Various example embodiments relate generally to communication systems and, more particularly but not exclusively, to supporting egress rerouting of packets at a communication device configured to be deployed in a communication system.

BACKGROUND

In communication networks, various communications technologies may be used to support various types of communications.

SUMMARY

In at least some example embodiments, an apparatus includes at least one processor and at least one memory storing instructions that, when executed by the at least one processor, cause the apparatus at least to receive, by a first egress forwarding element of a communication device via a switch fabric of the communication device, a switch fabric packet including a switch fabric header encapsulating a data packet, wherein the switch fabric header includes an indication of a primary next-hop for the data packet that is reachable via the first egress forwarding element of the communication device and an indication of a secondary next-hop for the data packet that is reachable via a second egress forwarding element of the communication device and forward, by the first egress forwarding element of the communication device based on the switch fabric header, the data packet. In at least some example embodiments, the indication of the primary next-hop for the data packet includes an address of the primary next-hop for the data packet, an identifier of the first egress forwarding element, and an identifier of a port of the first egress forwarding element associated with the primary next-hop for the data packet. In at least some example embodiments, the indication of the secondary next-hop for the data packet includes an address of the secondary next-hop for the data packet, an identifier of the second egress forwarding element, and an identifier of a port of the second egress forwarding element associated with the secondary next-hop for the data packet. In at least some example embodiments, the switch fabric packet is received from an ingress forwarding element via which the data packet arrived at the communication device. In at least some example embodiments, to forward the data packet, the instructions, when executed by the at least one processor, cause the apparatus at least to forward, by the first egress forwarding element of the communication device based on a determination that the primary next-hop is reachable, the data packet from the first egress forwarding element of the communication device toward the primary next-hop. In at least some example embodiments, to forward the data packet, the instructions, when executed by the at least one processor, cause the apparatus at least to reroute, by the first egress forwarding element of the communication device based on a determination to reroute the data packet from the primary next-hop to the secondary next-hop, the data packet from the first egress forwarding element of the communication device toward the second egress forwarding element of the communication device. In at least some example embodiments, the determination to reroute the data packet from the primary next-hop to the secondary next-hop is based on identification of a failure associated with the primary next-hop for the data packet. In at least some example embodiments, to reroute the data packet, the instructions, when executed by the at least one processor, cause the apparatus at least to send, by the first egress forwarding element toward the second egress forwarding element via the switch fabric, the data packet. In at least some example embodiments, to reroute the data packet, the instructions, when executed by the at least one processor, cause the apparatus at least to form, by the first egress forwarding element, a second switch fabric packet including a second switch fabric header encapsulating the data packet, wherein the second switch fabric header includes the indication of the secondary next-hop for the data packet and forward, by the first egress forwarding element via the switch fabric, the second switch fabric packet. In at least some example embodiments, the indication of the secondary next-hop for the data packet includes an address of the secondary next-hop for the data packet, an identifier of the second egress forwarding element, and an identifier of a port of the second egress forwarding element associated with the secondary next-hop for the data packet. In at least some example embodiments, the switch fabric packet is received by a packet processor of the first egress forwarding element and the data packet is forwarded by the packet processor of the first egress forwarding element.

In at least some example embodiments, a non-transitory computer readable medium includes computer program instructions that, when executed by an apparatus, cause the apparatus at least to receive, by a first egress forwarding element of a communication device via a switch fabric of the communication device, a switch fabric packet including a switch fabric header encapsulating a data packet, wherein the switch fabric header includes an indication of a primary next-hop for the data packet that is reachable via the first egress forwarding element of the communication device and an indication of a secondary next-hop for the data packet that is reachable via a second egress forwarding element of the communication device and forward, by the first egress forwarding element of the communication device based on the switch fabric header, the data packet. In at least some example embodiments, the indication of the primary next-hop for the data packet includes an address of the primary next-hop for the data packet, an identifier of the first egress forwarding element, and an identifier of a port of the first egress forwarding element associated with the primary next-hop for the data packet. In at least some example embodiments, the indication of the secondary next-hop for the data packet includes an address of the secondary next-hop for the data packet, an identifier of the second egress forwarding element, and an identifier of a port of the second egress forwarding element associated with the secondary next-hop for the data packet. In at least some example embodiments, the switch fabric packet is received from an ingress forwarding element via which the data packet arrived at the communication device. In at least some example embodiments, to forward the data packet, the computer program instructions, when executed by the apparatus, cause the apparatus at least to forward, by the first egress forwarding element of the communication device based on a determination that the primary next-hop is reachable, the data packet from the first egress forwarding element of the communication device toward the primary next-hop. In at least some example embodiments, to forward the data packet, the computer program instructions, when executed by the apparatus, cause the apparatus at least to reroute, by the first egress forwarding element of the communication device based on a determination to reroute the data packet from the primary next-hop to the secondary next-hop, the data packet from the first egress forwarding element of the communication device toward the second egress forwarding element of the communication device. In at least some example embodiments, the determination to reroute the data packet from the primary next-hop to the secondary next-hop is based on identification of a failure associated with the primary next-hop for the data packet. In at least some example embodiments, to reroute the data packet, the computer program instructions, when executed by the apparatus, cause the apparatus at least to send, by the first egress forwarding element toward the second egress forwarding element via the switch fabric, the data packet. In at least some example embodiments, to reroute the data packet, the computer program instructions, when executed by the apparatus, cause the apparatus at least to form, by the first egress forwarding element, a second switch fabric packet including a second switch fabric header encapsulating the data packet, wherein the second switch fabric header includes the indication of the secondary next-hop for the data packet and forward, by the first egress forwarding element via the switch fabric, the second switch fabric packet. In at least some example embodiments, the indication of the secondary next-hop for the data packet includes an address of the secondary next-hop for the data packet, an identifier of the second egress forwarding element, and an identifier of a port of the second egress forwarding element associated with the secondary next-hop for the data packet. In at least some example embodiments, the switch fabric packet is received by a packet processor of the first egress forwarding element and the data packet is forwarded by the packet processor of the first egress forwarding element.

In at least some example embodiments, a method includes receiving, by a first egress forwarding element of a communication device via a switch fabric of the communication device, a switch fabric packet including a switch fabric header encapsulating a data packet, wherein the switch fabric header includes an indication of a primary next-hop for the data packet that is reachable via the first egress forwarding element of the communication device and an indication of a secondary next-hop for the data packet that is reachable via a second egress forwarding element of the communication device and forwarding, by the first egress forwarding element of the communication device based on the switch fabric header, the data packet. In at least some example embodiments, the indication of the primary next-hop for the data packet includes an address of the primary next-hop for the data packet, an identifier of the first egress forwarding element, and an identifier of a port of the first egress forwarding element associated with the primary next-hop for the data packet. In at least some example embodiments, the indication of the secondary next-hop for the data packet includes an address of the secondary next-hop for the data packet, an identifier of the second egress forwarding element, and an identifier of a port of the second egress forwarding element associated with the secondary next-hop for the data packet. In at least some example embodiments, the switch fabric packet is received from an ingress forwarding element via which the data packet arrived at the communication device. In at least some example embodiments, forwarding the data packet includes forwarding, by the first egress forwarding element of the communication device based on a determination that the primary next-hop is reachable, the data packet from the first egress forwarding element of the communication device toward the primary next-hop. In at least some example embodiments, forwarding the data packet includes rerouting, by the first egress forwarding element of the communication device based on a determination to reroute the data packet from the primary next-hop to the secondary next-hop, the data packet from the first egress forwarding element of the communication device toward the second egress forwarding element of the communication device. In at least some example embodiments, the determination to reroute the data packet from the primary next-hop to the secondary next-hop is based on identification of a failure associated with the primary next-hop for the data packet. In at least some example embodiments, rerouting the data packet includes sending, by the first egress forwarding element toward the second egress forwarding element via the switch fabric, the data packet. In at least some example embodiments, rerouting the data packet includes forming, by the first egress forwarding element, a second switch fabric packet including a second switch fabric header encapsulating the data packet, wherein the second switch fabric header includes the indication of the secondary next-hop for the data packet and forwarding, by the first egress forwarding element via the switch fabric, the second switch fabric packet. In at least some example embodiments, the indication of the secondary next-hop for the data packet includes an address of the secondary next-hop for the data packet, an identifier of the second egress forwarding element, and an identifier of a port of the second egress forwarding element associated with the secondary next-hop for the data packet. In at least some example embodiments, the switch fabric packet is received by a packet processor of the first egress forwarding element and the data packet is forwarded by the packet processor of the first egress forwarding element.

In at least some example embodiments, an apparatus includes means for receiving, by a first egress forwarding element of a communication device via a switch fabric of the communication device, a switch fabric packet including a switch fabric header encapsulating a data packet, wherein the switch fabric header includes an indication of a primary next-hop for the data packet that is reachable via the first egress forwarding element of the communication device and an indication of a secondary next-hop for the data packet that is reachable via a second egress forwarding element of the communication device and means for forwarding, by the first egress forwarding element of the communication device based on the switch fabric header, the data packet. In at least some example embodiments, the indication of the primary next-hop for the data packet includes an address of the primary next-hop for the data packet, an identifier of the first egress forwarding element, and an identifier of a port of the first egress forwarding element associated with the primary next-hop for the data packet. In at least some example embodiments, the indication of the secondary next-hop for the data packet includes an address of the secondary next-hop for the data packet, an identifier of the second egress forwarding element, and an identifier of a port of the second egress forwarding element associated with the secondary next-hop for the data packet. In at least some example embodiments, the switch fabric packet is received from an ingress forwarding element via which the data packet arrived at the communication device. In at least some example embodiments, the means for forwarding the data packet includes means for forwarding, by the first egress forwarding element of the communication device based on a determination that the primary next-hop is reachable, the data packet from the first egress forwarding element of the communication device toward the primary next-hop. In at least some example embodiments, the means for forwarding the data packet includes means for rerouting, by the first egress forwarding element of the communication device based on a determination to reroute the data packet from the primary next-hop to the secondary next-hop, the data packet from the first egress forwarding element of the communication device toward the second egress forwarding element of the communication device. In at least some example embodiments, the determination to reroute the data packet from the primary next-hop to the secondary next-hop is based on identification of a failure associated with the primary next-hop for the data packet. In at least some example embodiments, the means for rerouting the data packet includes means for sending, by the first egress forwarding element toward the second egress forwarding element via the switch fabric, the data packet. In at least some example embodiments, the means for rerouting the data packet includes means for forming, by the first egress forwarding element, a second switch fabric packet including a second switch fabric header encapsulating the data packet, wherein the second switch fabric header includes the indication of the secondary next-hop for the data packet and means for forwarding, by the first egress forwarding element via the switch fabric, the second switch fabric packet. In at least some example embodiments, the indication of the secondary next-hop for the data packet includes an address of the secondary next-hop for the data packet, an identifier of the second egress forwarding element, and an identifier of a port of the second egress forwarding element associated with the secondary next-hop for the data packet. In at least some example embodiments, the switch fabric packet is received by a packet processor of the first egress forwarding element and the data packet is forwarded by the packet processor of the first egress forwarding element.

In at least some example embodiments, an apparatus includes at least one processor and at least one memory storing instructions that, when executed by the at least one processor, cause the apparatus at least to receive, at an ingress forwarding element of a communication device, a data packet, provide, at the ingress forwarding element of the communication device, a switch fabric packet including the data packet and including a switch fabric header configured to transport the data packet via a switch fabric of the communication device, wherein the switch fabric header includes an indication of a primary next-hop for the data packet that is reachable via a first egress forwarding element of the communication device and an indication of a secondary next-hop for the data packet that is reachable via a second egress forwarding element of the communication device, and forward, from the ingress forwarding element toward the first egress forwarding element of the communication device via the switch fabric, the switch fabric packet. In at least some example embodiments, the instructions, when executed by the at least one processor, cause the apparatus at least to determine, by the ingress forwarding element of the communication device, that egress rerouting is to be supported for the data packet. In at least some example embodiments, the primary next-hop for the data packet and the secondary next-hop for the data packet are determined from a table maintained on a packet processor of the ingress forwarding element of the communication device. In at least some example embodiments, the primary next-hop for the data packet and the secondary next-hop for the data packet are determined from source routing information of the data packet. In at least some example embodiments, the indication of the primary next-hop for the data packet includes an address of the primary next-hop for the data packet, an identifier of the first egress forwarding element, and an identifier of a port of the first egress forwarding element associated with the primary next-hop for the data packet. In at least some example embodiments, the indication of the secondary next-hop for the data packet includes an address of the secondary next-hop for the data packet, an identifier of the second egress forwarding element, and an identifier of a port of the second egress forwarding element associated with the secondary next-hop for the data packet. In at least some example embodiments, the instructions, when executed by the at least one processor, cause the apparatus at least to receive, at the ingress forwarding element of the communication device, an indication of a failure associated with the primary next-hop for the data packet, receive, at the ingress forwarding element of the communication device, a second data packet belonging to a data flow of the data packet, provide, at the ingress forwarding element of the communication device, a second switch fabric packet including the second data packet and a second switch fabric header configured to transport the data packet via the switch fabric of the communication device, wherein the second switch fabric header includes an indication of the secondary next-hop that is reachable via the second egress forwarding element of the communication device, and forward, from the ingress forwarding element of the communication device toward the second egress forwarding element of the communication device via the switch fabric, the second switch fabric packet.

In at least some example embodiments, a non-transitory computer readable medium includes computer program instructions that, when executed by an apparatus, cause the apparatus at least to receive, at an ingress forwarding element of a communication device, a data packet, provide, at the ingress forwarding element of the communication device, a switch fabric packet including the data packet and including a switch fabric header configured to transport the data packet via a switch fabric of the communication device, wherein the switch fabric header includes an indication of a primary next-hop for the data packet that is reachable via a first egress forwarding element of the communication device and an indication of a secondary next-hop for the data packet that is reachable via a second egress forwarding element of the communication device, and forward, from the ingress forwarding element toward the first egress forwarding element of the communication device via the switch fabric, the switch fabric packet. In at least some example embodiments, the computer program instructions, when executed by the apparatus, cause the apparatus at least to determine, by the ingress forwarding element of the communication device, that egress rerouting is to be supported for the data packet. In at least some example embodiments, the primary next-hop for the data packet and the secondary next-hop for the data packet are determined from a table maintained on a packet processor of the ingress forwarding element of the communication device. In at least some example embodiments, the primary next-hop for the data packet and the secondary next-hop for the data packet are determined from source routing information of the data packet. In at least some example embodiments, the indication of the primary next-hop for the data packet includes an address of the primary next-hop for the data packet, an identifier of the first egress forwarding element, and an identifier of a port of the first egress forwarding element associated with the primary next-hop for the data packet. In at least some example embodiments, the indication of the secondary next-hop for the data packet includes an address of the secondary next-hop for the data packet, an identifier of the second egress forwarding element, and an identifier of a port of the second egress forwarding element associated with the secondary next-hop for the data packet. In at least some example embodiments, the computer program instructions, when executed by the apparatus, cause the apparatus at least to receive, at the ingress forwarding element of the communication device, an indication of a failure associated with the primary next-hop for the data packet, receive, at the ingress forwarding element of the communication device, a second data packet belonging to a data flow of the data packet, provide, at the ingress forwarding element of the communication device, a second switch fabric packet including the second data packet and a second switch fabric header configured to transport the data packet via the switch fabric of the communication device, wherein the second switch fabric header includes an indication of the secondary next-hop that is reachable via the second egress forwarding element of the communication device, and forward, from the ingress forwarding element of the communication device toward the second egress forwarding element of the communication device via the switch fabric, the second switch fabric packet.

In at least some example embodiments, a method includes receiving, at an ingress forwarding element of a communication device, a data packet, providing, at the ingress forwarding element of the communication device, a switch fabric packet including the data packet and including a switch fabric header configured to transport the data packet via a switch fabric of the communication device, wherein the switch fabric header includes an indication of a primary next-hop for the data packet that is reachable via a first egress forwarding element of the communication device and an indication of a secondary next-hop for the data packet that is reachable via a second egress forwarding element of the communication device, and forwarding, from the ingress forwarding element toward the first egress forwarding element of the communication device via the switch fabric, the switch fabric packet. In at least some example embodiments, the method includes determining, by the ingress forwarding element of the communication device, that egress rerouting is to be supported for the data packet. In at least some example embodiments, the primary next-hop for the data packet and the secondary next-hop for the data packet are determined from a table maintained on a packet processor of the ingress forwarding element of the communication device. In at least some example embodiments, the primary next-hop for the data packet and the secondary next-hop for the data packet are determined from source routing information of the data packet. In at least some example embodiments, the indication of the primary next-hop for the data packet includes an address of the primary next-hop for the data packet, an identifier of the first egress forwarding element, and an identifier of a port of the first egress forwarding element associated with the primary next-hop for the data packet. In at least some example embodiments, the indication of the secondary next-hop for the data packet includes an address of the secondary next-hop for the data packet, an identifier of the second egress forwarding element, and an identifier of a port of the second egress forwarding element associated with the secondary next-hop for the data packet. In at least some example embodiments, the method includes receiving, at the ingress forwarding element of the communication device, an indication of a failure associated with the primary next-hop for the data packet, receiving, at the ingress forwarding element of the communication device, a second data packet belonging to a data flow of the data packet, providing, at the ingress forwarding element of the communication device, a second switch fabric packet including the second data packet and a second switch fabric header configured to transport the data packet via the switch fabric of the communication device, wherein the second switch fabric header includes an indication of the secondary next-hop that is reachable via the second egress forwarding element of the communication device, and forwarding, from the ingress forwarding element of the communication device toward the second egress forwarding element of the communication device via the switch fabric, the second switch fabric packet.

In at least some example embodiments, an apparatus includes means for receiving, at an ingress forwarding element of a communication device, a data packet, means for providing, at the ingress forwarding element of the communication device, a switch fabric packet including the data packet and including a switch fabric header configured to transport the data packet via a switch fabric of the communication device, wherein the switch fabric header includes an indication of a primary next-hop for the data packet that is reachable via a first egress forwarding element of the communication device and an indication of a secondary next-hop for the data packet that is reachable via a second egress forwarding element of the communication device, and means for forwarding, from the ingress forwarding element toward the first egress forwarding element of the communication device via the switch fabric, the switch fabric packet. In at least some example embodiments, the apparatus includes means for determining, by the ingress forwarding element of the communication device, that egress rerouting is to be supported for the data packet. In at least some example embodiments, the primary next-hop for the data packet and the secondary next-hop for the data packet are determined from a table maintained on a packet processor of the ingress forwarding element of the communication device. In at least some example embodiments, the primary next-hop for the data packet and the secondary next-hop for the data packet are determined from source routing information of the data packet. In at least some example embodiments, the indication of the primary next-hop for the data packet includes an address of the primary next-hop for the data packet, an identifier of the first egress forwarding element, and an identifier of a port of the first egress forwarding element associated with the primary next-hop for the data packet. In at least some example embodiments, the indication of the secondary next-hop for the data packet includes an address of the secondary next-hop for the data packet, an identifier of the second egress forwarding element, and an identifier of a port of the second egress forwarding element associated with the secondary next-hop for the data packet. In at least some example embodiments, the apparatus includes means for receiving, at the ingress forwarding element of the communication device, an indication of a failure associated with the primary next-hop for the data packet, means for receiving, at the ingress forwarding element of the communication device, a second data packet belonging to a data flow of the data packet, means for providing, at the ingress forwarding element of the communication device, a second switch fabric packet including the second data packet and a second switch fabric header configured to transport the data packet via the switch fabric of the communication device, wherein the second switch fabric header includes an indication of the secondary next-hop that is reachable via the second egress forwarding element of the communication device, and means for forwarding, from the ingress forwarding element of the communication device toward the second egress forwarding element of the communication device via the switch fabric, the second switch fabric packet.

BRIEF DESCRIPTION OF THE DRAWINGS

The teachings herein can be readily understood by considering the following detailed description in conjunction with the accompanying drawings, in which:

FIGS. 6A-6E depict example embodiments of packets and tables for supporting forwarding of Ethernet packets through the forwarding plane of the router chassis of FIG. 4 for delivery to a primary next-hop of the data packet flow as illustrated in FIG. 5;

FIGS. 9A-9F depict example embodiments of packets and tables for supporting forwarding of Ethernet packets through the forwarding plane of the router chassis of FIG. 4 for delivery to the secondary next-hop of the data packet flow based on egress rerouting as illustrated in FIG. 8;

FIGS. 11A-11E depict example embodiments of packets and tables for supporting forwarding of Ethernet packets through the forwarding plane of the router chassis of FIG. 4 for delivery to the secondary next-hop of the data packet flow based on ingress rerouting as illustrated in FIG. 10;

To facilitate understanding, identical reference numerals have been used herein, wherever possible, in order to designate identical elements that are common among the various figures.

DETAILED DESCRIPTION

Various example embodiments for supporting egress rerouting of data packets in communication devices are presented herein. The egress rerouting of a data packet in a communication device may be performed by rerouting a data packet received via an ingress forwarding element of the communication device where the rerouting is performed at the egress side of the communication device for the data packet. The egress rerouting of a data packet in a communication device may be performed by rerouting a data packet received via an ingress forwarding element of the communication device from a first egress forwarding element of the communication device associated with a primary next-hop for the data packet to a second egress forwarding element of the communication device associated with a secondary next-hop for the data packet via a switch fabric of the communication device. The egress rerouting of a data packet in a communication device may be performed by receiving the data packet via the ingress forwarding element, forming a first switch fabric packet at the ingress forwarding element by encapsulating the data packet within a first switch fabric header that includes an indication of the primary next-hop for the data packet and an indication of a secondary next-hop for the data packet, sending the first switch fabric packet from the ingress forwarding element to the first egress forwarding element via the switch fabric of the communication device, receiving the first switch fabric packet at the first egress forwarding element via the switch fabric of the communication device, determining at the first egress forwarding element to reroute the data packet from the primary next-hop to the secondary next-hop, forming a second switch fabric packet at the first egress forwarding element by encapsulating the data packet within a second switch fabric header that includes the indication of the secondary next-hop for the data packet, sending the second switch fabric packet from the first egress forwarding element to the second egress forwarding element via the switch fabric of the communication device, receiving the second switch fabric packet at the second egress forwarding element via the switch fabric of the communication device, and forwarding the data packet from the second egress forwarding element toward the secondary next-hop. The communication device may be a router (e.g., a router chassis including a set of forwarding cards interconnected by a switch fabric), a switch (e.g., a switch including a set of forwarding cards interconnected by a switch fabric), or the like. It will be appreciated that these and various other example embodiments and advantages or potential advantages of example embodiments for supporting egress rerouting of data packets in communication devices may be further understood by way of reference to the various figures, which are discussed further below.

Figure 1:
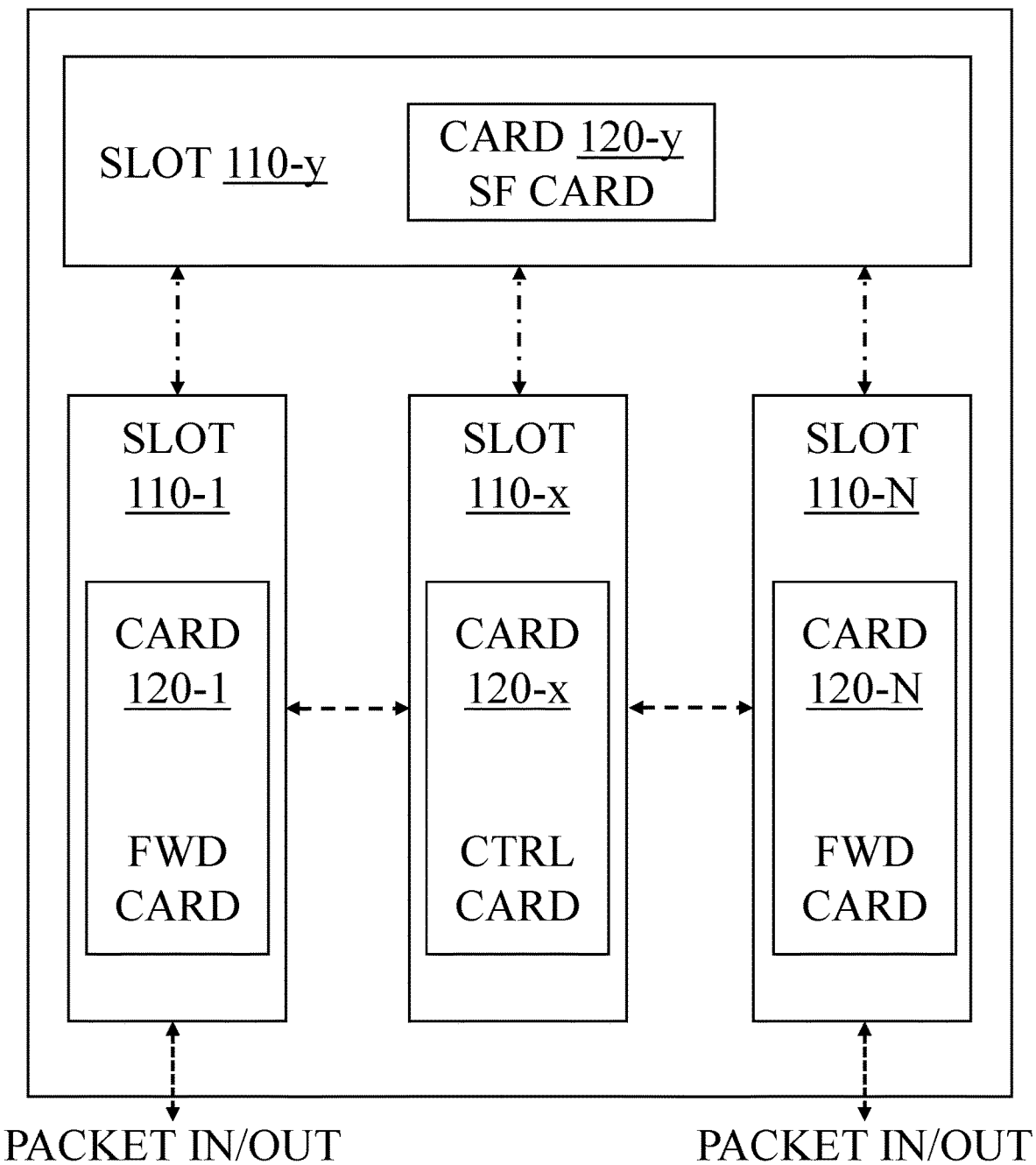
FIG. 1 depicts an example embodiment of a router chassis configured to support egress rerouting of data packets.

FIG. 1 depicts an example embodiment of a router chassis configured to support egress rerouting of data packets.

As depicted in FIG. 1, the router chassis 100 includes a fixed number of slots 110-1 to 110-N (collectively, slots 110, with slot 110-1, slot 110-x, slot 110-y, and slot 110-N being illustrated) hosting a set of cards 120-1 to 120-N (collectively, cards 120, with card 120-1 being illustrated as being with slot 110-1, card 120-x being illustrated as being with slot 110-x, card 120-y being illustrated as being with slot 110-y, and card 120-N being illustrated as being with slot 110-N), respectively. Here, a slot 110 is a location within the router chassis 100 that is configured to accept a card 120. Here, a card 120 is a unit of the router chassis 100 that is configured to perform a distinct set of functions, such as traffic forwarding functions, switch fabric functions, control functions, or the like. The set of cards 120 includes one or more forwarding (FWD) cards that operate in the data plane, one or more control (CTRL) cards that operate in the control plane, and one or more switch fabric (SF) cards that support the data plane and the control plane. As depicted in FIG. 1, in the router chassis 100, slot 110-1 and slot 110-N each include FWD cards (card 120-1 and card 120-N, respectively), slot 110-x includes a CTRL card (card 120-x), and slot 110-y includes an SF card (card 120-y). The CTRL card is configured to implement at least part of the control plane of the router chassis 100. The CTRL card is configured to support control functions for the FWD cards. An example embodiment of a CTRL card is presented in FIG. 2. The FWD cards are configured to implement the forwarding plane of the router chassis 100 (e.g., receiving packets from the network, processing packets, and sending packets to the network). The FWD cards each may support one or more interfaces (e.g., ports or the like) configured to support communication of packets (denoted as "packets in/out" supporting communication of packets to/from the router chassis 100). An example embodiment of an FWD card is presented in FIG. 3. It will be appreciated that the FWD card(s), SF card(s), and CTRL card(s) may be installed in any suitable slot(s) of the router chassis 100.

As depicted in FIG. 1, the router chassis 100 includes a control fabric (CF) 130. The CF 130 is configured to support control plane communications (e.g., supporting communication of control plane packets originating or terminating in the control plane) between the CTRL card and the FWD cards (illustratively, the CF 130 supports control communications between the CTRL card in slot 110-x and the FWD cards in slot 110-1 and slot 110-N). The CF 130 may be configured to support various control operations performed by the CTRL card for the FWD cards (e.g., such as setting up packet forwarding states, exchanging various notifications and alarms, gathering statistics and telemetry information, or the like, as well as various combinations thereof). The CF 130 may be configured to support various other control operations which may be supported by the control plane of the router chassis 100.

As depicted in FIG. 1, the router chassis 100 includes a switch fabric (SF) 140. The SF 140, which includes the SF card in slot 110-y, supports communications between the SF card in slot 110-y and each of the other cards in the other slots (illustratively, the FWD cards in slot 110-1 and slot 110-N and the CTRL card in slot 110-x). The SF 140 may be orchestrated by the SF card in slot 110-y. The SF 140 is configured to support data plane communications (e.g., supporting communication of data packets of traffic flows traversing the router chassis 100) between FWD cards. The SF 140 is configured to support control plane communications (e.g., supporting communication of control protocol packets originating or terminating in the control plane) between the CTRL card and the FWD cards. The SF 140 may be configured to support various other data plane operations which may be supported by the data plane of the router chassis 100 and/or various other control operations which may be supported by the control plane of the router chassis 100.

It will be appreciated that the router chassis 100, although primarily presented with respect to specific types, numbers, and arrangements of elements and interfaces, may be implemented using various other types, numbers, and/or arrangements of elements, using various other types, numbers, and/or arrangements of interfaces, or the like, as well as various combinations thereof.

Figure 2:
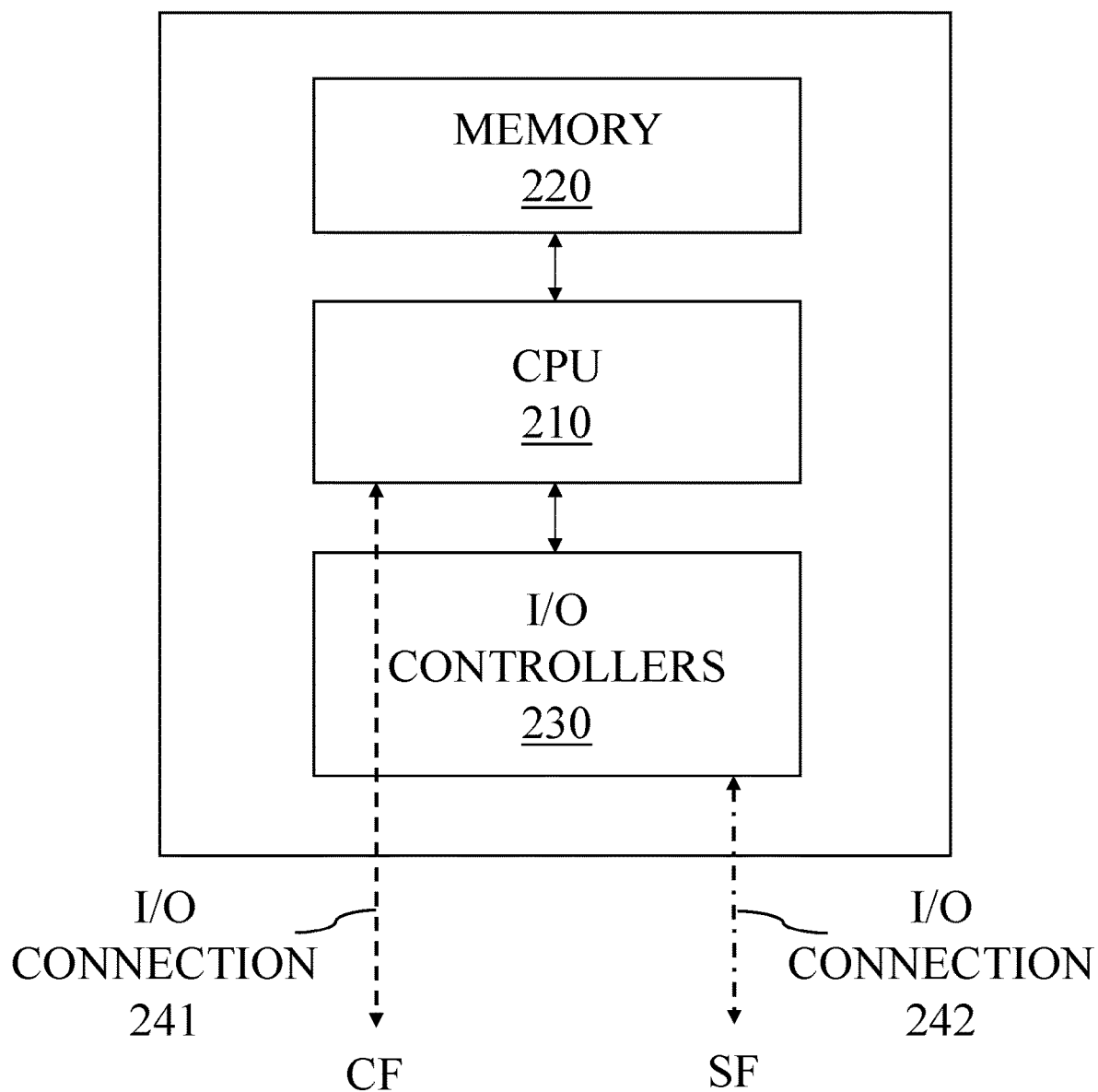
FIG. 2 depicts an example embodiment of a control card for use in the router chassis of FIG. 1.

FIG. 2 depicts an example embodiment of a control card for use in the router chassis of FIG. 1.

As discussed herein, the control card 200 is configured to provide control plane operations for a router chassis in which the control card 200 is deployed. For example, the control card 200 may be configured to set the packet forwarding states into the packet forwarding plane (also known as the data plane) that is implemented by a forwarding card(s). For example, the control card 200 may be configured to run various control protocols, such as Open Shortest Path First (OSPF), Intermediate-System-to-Intermediate-System (IS-IS), Border Gateway Protocol (BGP), Bidirectional Forwarding Detection (BFD), Label Distribution Protocol (LDP), Resource Reservation Protocol (RSVP), RSVP—Traffic Engineering (RSVP-TE), or the like, as well as various combinations thereof. For example, the control card 200 may be configured to provide configuration management. It will be appreciated that the control card 200 may be configured to provide various other control plane functions for a router chassis.

As depicted in FIG. 2, the control card 200 includes a central processing unit (CPU) 210, a memory 220, and input/output (I/O) controllers 230. The CPU 210, the memory 220, and the I/O controllers 230 may be configured to cooperate to support various control plane functions at the control card 200. The CPU 210 is configured to control the operation of the control card 200. The CPU 210 is connected to the memory 220. The memory 220 is configured to store various types of information related to the operation of the control card 200 (e.g., instructions which may be executed by the CPU 210 for providing various control plane functions at the control card 200, control data related to control plane functions provided by the control card 200, or the like, as well as various combinations thereof). The CPU 210 also is connected to the I/O controllers 230 for communicating with various I/O devices. The I/O controllers 230 may be configured to interface with various other elements using high-speed communication buses or other suitable types of interfaces or connections. The CPU 210, the memory 220, and the I/O controllers 230 may be configured to cooperate to support various other control plane functions at the control card 200.

As depicted in FIG. 2, the control card 200 is configured to interface with the control fabric (CF) and the switch fabric (SF) of the router chassis in which the control card 200 is deployed. The control card 200 may interface with the CF and the SF via the I/O controllers 230. As depicted in FIG. 2, two I/O connections supported by the I/O controllers 230 include an I/O connection 241 to the CF and an I/O connection 242 to the SF.). The I/O connection 241 to the CF terminates on the CPU 210 and traverses the I/O controllers 230 (e.g., via an I/O controller that is specific to the CF). The I/O connection 242 to the SF terminates on the I/O controllers 230 (e.g., an I/O controller that is specific to the SF). It will be appreciated that the control card 200 may interface with the CF and the SF of the router chassis in which the control card 200 is deployed in various other ways.

Figure 3:
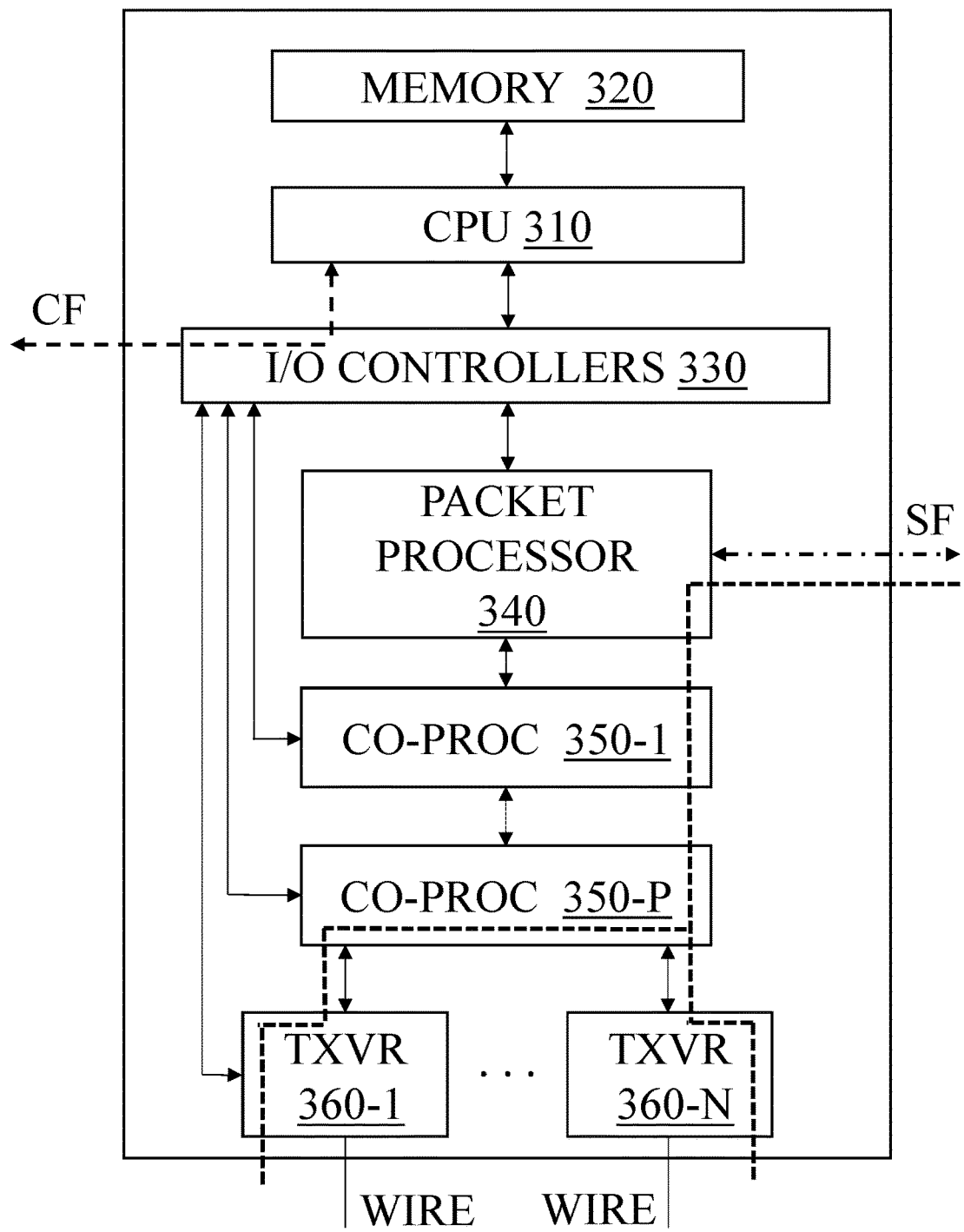
FIG. 3 depicts an example embodiment of a forwarding card for use in the router chassis of FIG. 1.

It will be appreciated that the control card 200, although primarily presented with respect to specific types, numbers, and arrangements of elements and interfaces, may be implemented using various other types, numbers, and/or arrangements of elements, using various other types, numbers, and/or arrangements of interfaces, or the like, as well as various combinations thereof. FIG. 3 depicts an example embodiment of a forwarding card for use in the router chassis of FIG. 1.

As discussed herein, the forwarding card 300 is configured to provide forwarding plane operations for a router chassis in which the forwarding card 300 is deployed. For example, the forwarding card 300 may be configured to supporting handling of packets in the forwarding plane, including receiving the packets, processing the packets, and sending the packets. For example, the forwarding card 300 may be configured to support various packet processing functions. For example, the forwarding card 300 may be configured to maintain packet forwarding states for the packet forwarding plane. For example, the forwarding card 300 may be configured support forwarding of data packets which may be based on various data plane protocols, such as Ethernet, Multiprotocol Label Switching (MPLS), Bit-Indexed Explicit Replication (BIER), Internet Protocol (IP), or the like, as well as various combinations thereof. It will be appreciated that the forwarding card 300 may be configured to provide various other forwarding plane operations for a router chassis.

As depicted in FIG. 3, the forwarding card 300 includes a central processing unit (CPU) 310, a memory 320, input/output (I/O) controllers 330, a packet processor 340, a set of co-processors 350-1 to 350-P (collectively, co-processors 350), and a set of transceivers 360-1 to 360-N (collectively, co-processors 360). The CPU 310 is connected to the memory 320. The CPU 310 also is connected to the I/O controllers 330 for communicating with various I/O devices. The packet processor 340 is connected to the I/O controllers 330 and also may be connected to one or more of the co-processors 350 (illustratively, only a direct connection to co-processor 350-1 is depicted). The co-processors 350 are each connected to the I/O controllers 330 and may be connected to each other (illustratively, only a direct connection between co-processor 350-1 and co-processor 350-P is depicted) and may be connected to the packet processor 340 (illustratively, only a direct connection from co-processor 350-1 to the packet processor 340 is depicted). The transceivers 360 are each connected to the I/O controllers 330 and may be connected to the packet processor 340 and/or one or more of the co-processors 350 (illustratively, only a direct connection from the transceivers 360 to the co-processor 350-P is depicted). It will be appreciated that the various elements of the forwarding card 300 may be communicatively connected in various other ways.

The CPU 310, the memory 320, and the I/O controllers 330 may be configured to co-operate to support various forwarding plane functions at the forwarding card 300. The CPU 310 is configured to control the operation of the forwarding card 300. The CPU 310 may be configured to receive various control messages/commands from a control plane card through the CF and then trigger actions on packet forwarding components (e.g., packet processor 340, co-processors 350, transceivers 360, or the like) through I/O connections to the packet forwarding components. The memory 320 is configured to store various types of information related to the operation of the forwarding card 300 (e.g., instructions which may be executed by the CPU 310 for providing various forwarding plane functions at the forwarding card 300, data related to forwarding plane functions provided by the forwarding card 300, or the like, as well as various combinations thereof). The I/O controllers 330 may be configured to interface with various other elements using high-speed communication buses or other suitable types of interfaces or connections. The CPU 310, the memory 320, and the I/O controllers 330 may be configured to co-operate to support various other forwarding plane functions at the forwarding card 300.

The packet processor 340 and the co-processors 350 may be configured to provide various forwarding plane functions at the forwarding card 300. For example, the packet processor 340 may perform processing related to forwarding of packets based on one or more headers of one or more data plane protocols (e.g., Ethernet, MPLS, BIER, IPv4, IPv6, or the like, as well as various combinations thereof), such as where the information in packets headers of the packets maps the packets to flows and forwarding decisions are made for the packets based on state programmed for the flows in one or more forwarding tables stored in memory of the packet processor 340. For example, the co-processors 350 may perform processing associated with supporting Layer 2 functions (e.g., Media Access Control (MAC) or the like), Layer 1 functions (e.g., physical layer processing functions), security functions (e.g., encryption/decryption, authentication, or the like), or the like, as well as various combinations thereof.

As depicted in FIG. 3, the forwarding card 300 is configured to interface with the switch fabric (SF) and the control fabric (CF) of the router chassis in which the forwarding card 300 is deployed. The forwarding card 300 may interface with the SF via the packet processor 340. The forwarding card 300 may interface with the CF via the I/O controllers 330 (illustratively, an I/O connection to the CF may terminate on the CPU 310 and traverse the I/O controllers 330). It will be appreciated that the forwarding card 300 may interface with the SF and the CF of the router chassis in which the forwarding card 300 is deployed in various other ways.

As discussed above, the forwarding card 300 is configured to receive data packets on the packet receive (ingress) side of the router chassis. A transceiver 360 receives a data packet from a port (received over the wire). The transceiver 360 sends the data packet through the co-processors 350 until the data packet reaches the packet processor 340. The packet processor 340 looks up various forwarding states based on one or more data packet headers in the data packet (e.g., Ethernet, MPLS, BIER, IP, or the like) and sends the data packet to the SF by adding an internal header, referred to as a switch fabric (SF) header, that includes the indication of the destination card (e.g., a CTRL card or FWD card) for which the data packet is intended and some commands for the destination card for the processing of the data packet at the destination card. The SF card receives the data packet with the SF header, parses the SF header, and, based on information in the SF header, provides the data packet to the destination card. If the destination card is a CTRL card, then the data packet is handled by software running on the CPU of the CTRL card. If the destination card is a FWD card then the FWD card performs the actions described below for the transmit (egress) side of the router chassis.

As discussed above, the forwarding card 300 is configured to send packets on the packet transmit (egress) side. The packet processor 340 receives the data packet including the SF header from the SF card. The packet processor 340 looks up various states based on one or more data packet headers in the data packet and/or based on one or more commands included in the SF header. The packet processor 340 removes the SF header from the data packet and, based on various states at the egress side and the information included in the SF header, may modify the existing data packet header(s) and/or add one or more additional data packet headers. The data packet is propagated through the co-processors 350 to the transceiver 360 over which the packet is to be sent. The data packet is propagated through the transceiver 360 to its associated egress port and then sent out over the wire.

It will be appreciated that the forwarding card 300, although primarily presented with respect to specific types, numbers, and arrangements of elements and interfaces, may be implemented using various other types, numbers, and/or arrangements of elements, using various other types, numbers, and/or arrangements of interfaces, or the like, as well as various combinations thereof.

Figure 4:
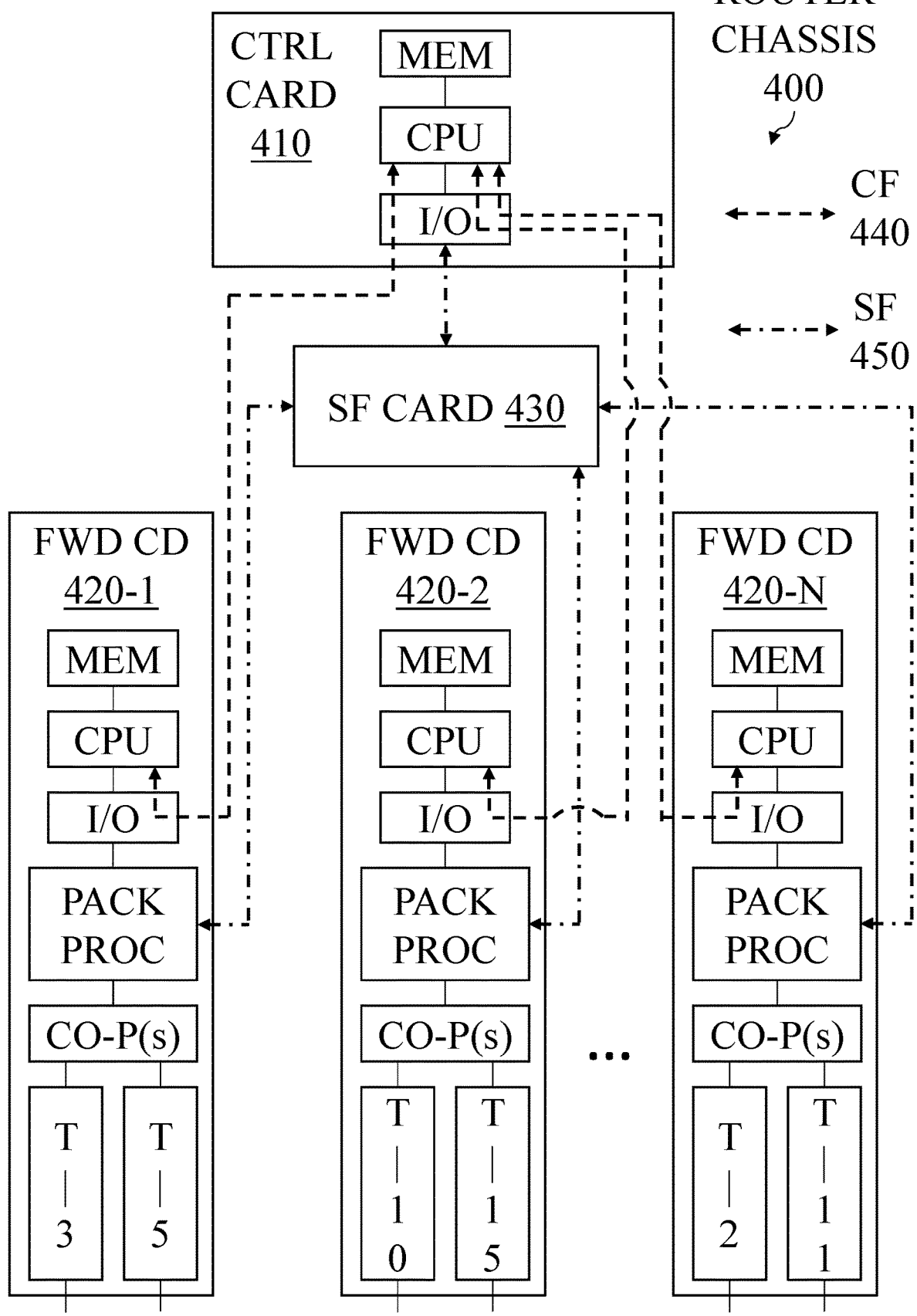
FIG. 4 depicts an example embodiment of a router chassis configured to support egress rerouting of data packets.

FIG. 4 depicts an example embodiment of a router chassis configured to support egress rerouting of data packets.

As depicted in FIG. 4, a router chassis 400 includes a control card 410 (denoted as CTRL CARD 410), a set of forwarding cards 420-1 to 420-N (collectively, forwarding cards 420, which are denoted as FWD CD 420-1 to FWD CD 420-N), a switch fabric (SF) card 430, a control fabric (CF) 440, and a switch fabric (SF) 450. The router chassis 400 is similar to the router chassis 100 of FIG. 1, while also illustrating additional details of the cards as depicted in FIG. 2 (for the control card) and FIG. 3 (for the forwarding cards). More specifically, the control card 410 is similar to the control card 200 of FIG. 2 and each of the forwarding cards 420 is similar to the forward card 300 of FIG. 3.

As depicted in FIG. 4, the CF 440 provides a fabric supporting control and management messaging between the control plane and the forwarding plane. The CF 440 interconnects the CPU of the control card 410 with the CPUs of each of the forwarding cards 420. The CF 440 is used for control and management messaging between the control card 410 and the forwarding cards 420 using control messages referred to as inter-card control messages. For example, inter-card control messages may be used for configuration of the forwarding plane by the control plane, notification of alarms and alerts generated in the forwarding plane to the control plane (e.g., port down events, card failure events, or the like), communication of heartbeats to check the connectivity between cards, notification of neighboring element failures from the forwarding plane to the control plane (e.g., neighboring node failures, neighboring link failures, or the like), or the like, as well as various combinations thereof. The CF 440 may be implemented in various ways, such as by implementing the CF 440 as an Ethernet network and exchanging inter-card control messages as Transmission Control Protocol (TCP)/Internet Protocol (IP) messages or using any other suitable communications technologies.

As depicted in FIG. 4, the SF 450 provides a fabric through which data packets are exchanged between cards of the router chassis 400. The SF 450 is used for forwarding data packets and provides the highest bandwidth and lowest latency path in the router chassis 400 (e.g., up to rates at multiples of terabits in core routers with near-zero latency), and is generally lossless. The SF 450 interconnects the packet processors of all of the forwarding cards 420 via the SF card 430 and connects the packet processors of the forwarding cards 420 with the I/O control interface of the control card 410 via the SF card 430. The SF 450 is a fabric through which a data packet received via a first port in a first forwarding card 420 and sent via a second port in a second forwarding card 420 is transported between the first forwarding card 420 (illustratively, the packet processor of the first forwarding card 420) and the second forwarding card 420 (illustratively, the packet processor of the second forwarding card 420). It will be appreciated that the SF card 430 forms part of the SF 450. The SF 450 may be implemented using application-specific integrated circuit (ASIC)-related communication capabilities (e.g., ASIC-to-ASIC communication capabilities). For example, the SF 450 may be implemented using bundles of serializer/deserializer (SerDes) lanes. For example, a one terabit fabric link in the SF 450 may be composed of 10x100-gigabit SerDes lanes, 20x50-gigabit SerDes lanes, or the like. The operation of the SF 450 in supporting forwarding of data packets may be further understood by considering forwarding of data packets through the SF 450 where both primary and secondary paths may be supported for forwarding of the data paths from the router chassis 400 for delivery to the intended destination, including forwarding of packets prior to a FRR operation (e.g., as presented with respect to FIG. 5 and FIGS. 6A-6E), forwarding of packets after a FRR operation using egress rerouting (e.g., as presented with respect to FIG. 8 and FIGS. 9A-9F), and forwarding of packets after an FRR operation using ingress rerouting (e.g., as presented with respect to FIG. 10 and FIGS. 11A-11E).

As discussed further below, the router chassis 400 may be configured to support ingress rerouting of data packets and egress rerouting of data packets. The router chassis 400 may support ingress rerouting of data packets, of a packet flow traversing a primary path from an ingress forwarding card to an egress forwarding card, by supporting rerouting of data packets by the ingress forwarding card in response to detection of a failure of the primary path by the ingress forwarding card. The router chassis 400 may support egress rerouting of data packets, of a packet flow traversing a primary path from an ingress forwarding card to an egress forwarding card, by supporting rerouting of data packets by the egress forwarding card in response to detection of a failure of the primary path by the egress forwarding card. The ingress forwarding card may support egress rerouting of data packets by the egress forwarding card by associating secondary path information for the data packet flow with the data packets provided by the ingress forwarding card to the egress forwarding card (e.g., including the secondary path information within the switch fabric header used to transport the data packets from the ingress forwarding card to the egress forwarding card). The egress forwarding card of the primary path may support egress rerouting of data packets to the egress forwarding card of the secondary path, based on secondary path information associated with the data packets received by the egress forwarding card from the ingress forwarding card (e.g., included within the switch fabric header used to transport the data packets from the ingress forwarding card to the egress forwarding card), by using the secondary path information to reroute the data packets from the egress forwarding card of the primary path to the second egress forwarding card of the secondary path. It will be appreciated that, since detection of the failure of the primary path by the egress forwarding card of the primary path happens prior to detection of the failure of the primary path by the ingress forwarding card, use of egress rerouting ensures that less packets are dropped in response to failure of the primary path. The operation of the router chassis 400 in supporting rerouting of data packets may be further understood by considering examples illustrating forwarding of packets prior to a FRR operation (e.g., as presented with respect to FIG. 5 and FIGS. 6A-6E), forwarding of packets after a FRR operation using egress rerouting (e.g., as presented with respect to FIG. 8 and FIGS. 9A-9F), and forwarding of packets after an FRR operation using ingress rerouting (e.g., as presented with respect to FIG. 10 and FIGS. 11A-11E).

It will be appreciated that the router chassis 400, although primarily presented with respect to specific types, numbers, and arrangements of elements and interfaces, may be implemented using various other types, numbers, and/or arrangements of elements, using various other types, numbers, and/or arrangements of interfaces, or the like, as well as various combinations thereof.

Figure 5:
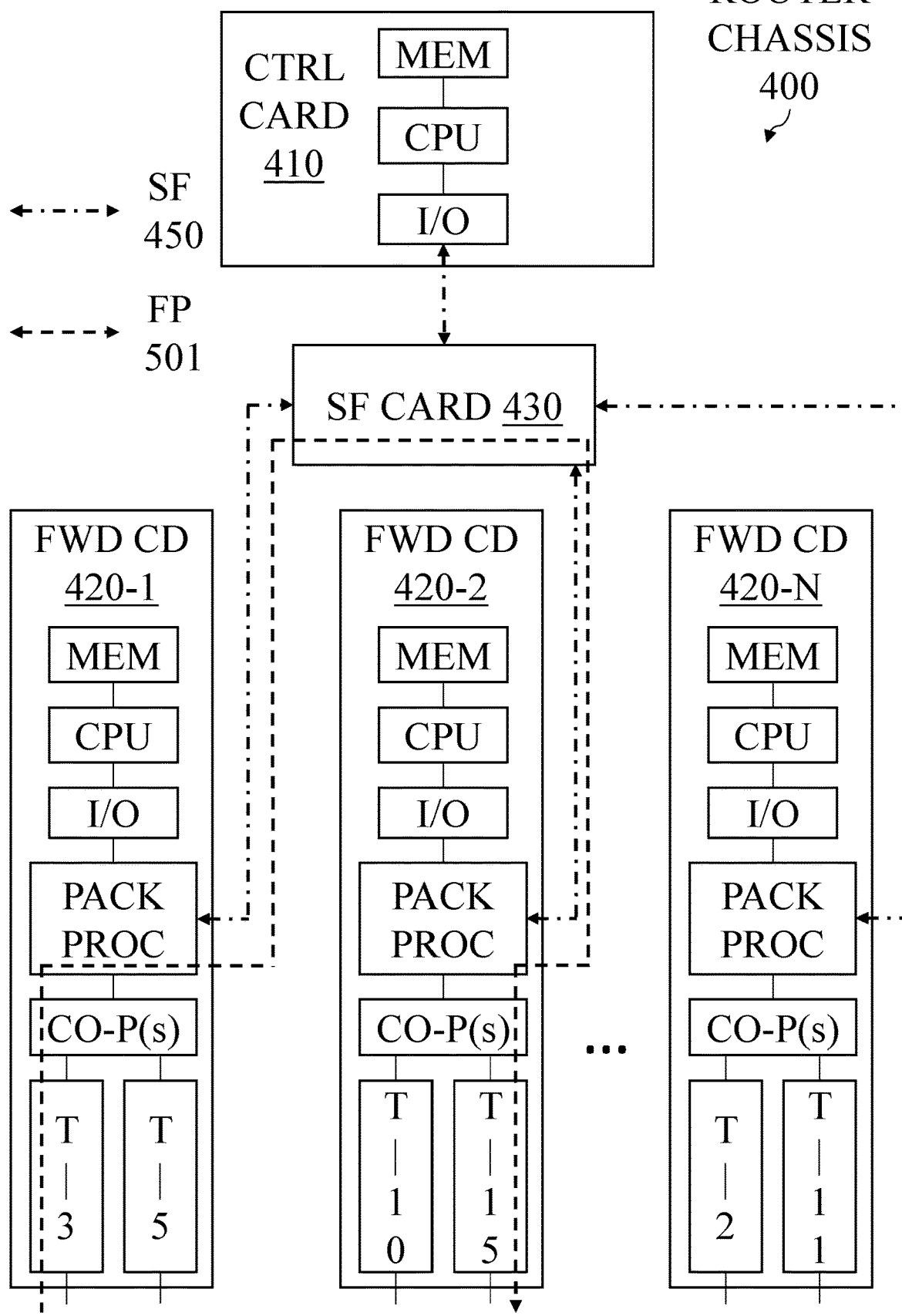
FIG. 5 depicts an example embodiment for forwarding of data packets of a data packet flow through the forwarding plane of the router chassis of FIG. 4 for delivery to a primary next-hop of the data packet flow.

FIG. 5 depicts an example embodiment for forwarding of data packets of a data packet flow through the forwarding plane of the router chassis of FIG. 4 prior to a fast reroute operation. In FIG. 5, the router chassis 400 of FIG. 4 is depicted. The router chassis 400 is supporting a packet flow along a flow path (FP) 501. The FP 501 is a primary flow path, prior to a failure associated with the primary next-hop of the data packet flow, in which the data packets of the data packet flow are sent from the router chassis 400 toward the primary next-hop for the data packet flow that is accessible via egress forwarding card 420-2. For the data packet flow on FP 501, packets enter the router chassis 400 on port 3 of card 1 (illustratively, on transceiver T-3 of forwarding card 420-1, which is the ingress card for the data packet flow on FP 501) and leave the router chassis 400 on port 15 of card 2 (illustratively, on transceiver T-15 of forwarding card 420-2, which is the primary egress card for the data packet flow on FP 501). For the data packet flow on FP 501, on the ingress card, the packets are received at the transceiver T-3 over the wire into the router chassis 400 and provided from the transceiver T-3 through the co-processors on the ingress card to the packet processor on the ingress card. For the data packet flow on FP 501, the packets are transported from the packet processor on the ingress card to the packet processor on the egress card via the SF 450. For the data packet flow on FP 501, on the egress card, the packets are routed from the packet processor through the co-processors on the egress card to the transceiver T-15 for transmission on the wire out of the router chassis 400 toward the primary next-hop for the data packet flow. It will be appreciated that forwarding of packets through the router chassis 400 of FIG. 5 using FP 501 may be further understood by way of reference to the following example described with respect to the packet formats and information tables of FIGS. 6A-6E.

Figure 6A:
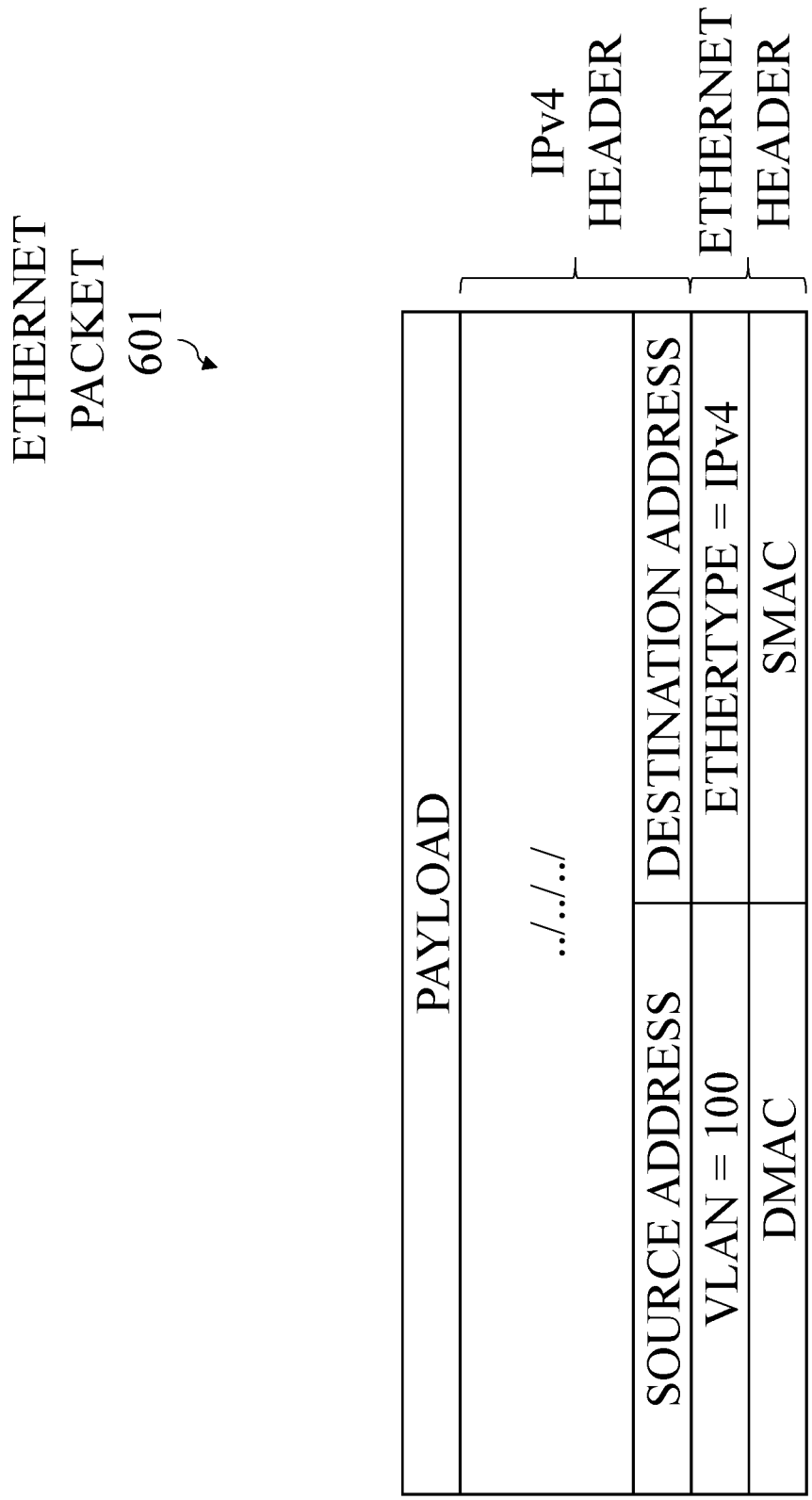
Figure 6C:
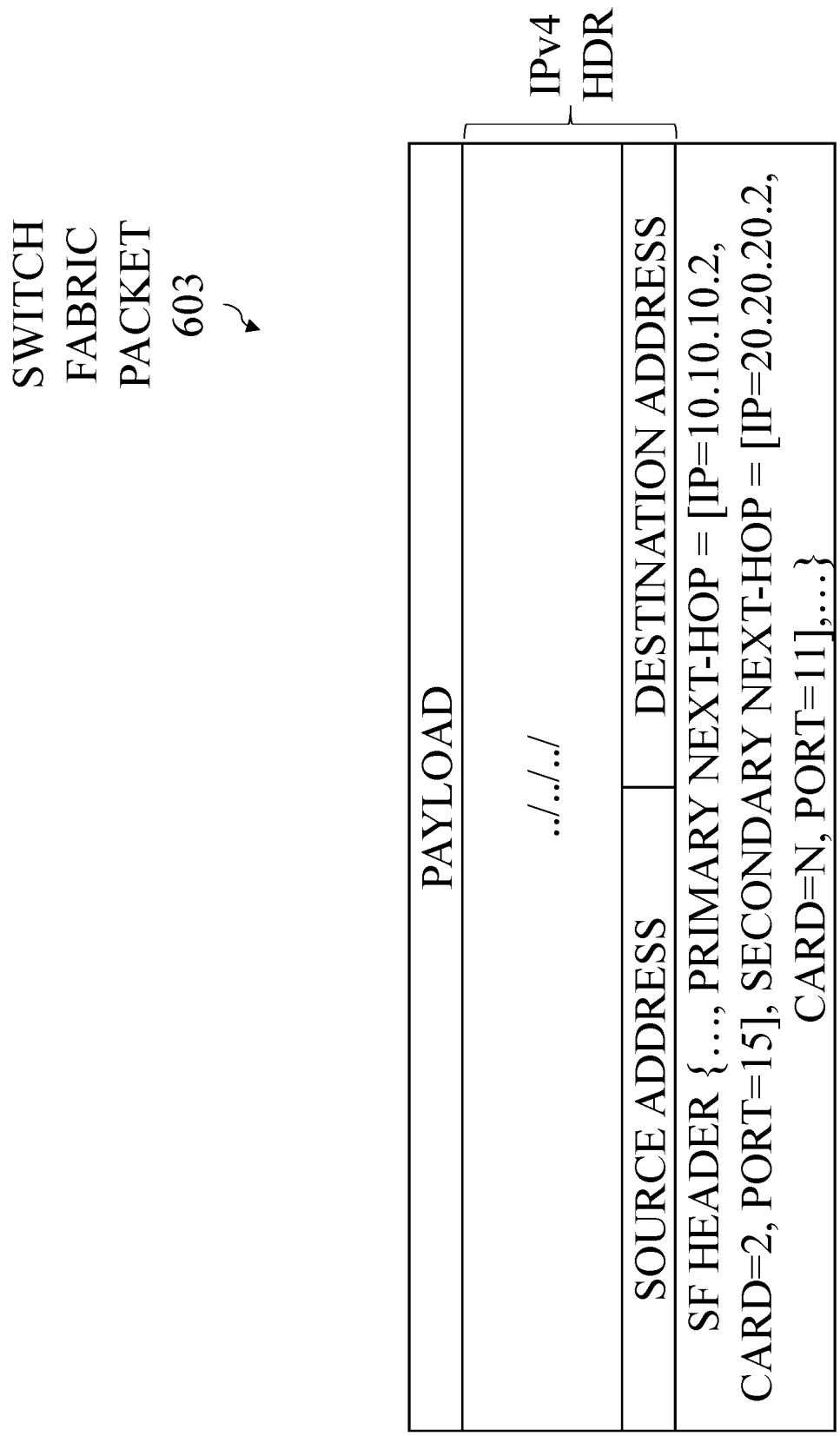
Figure 6E:
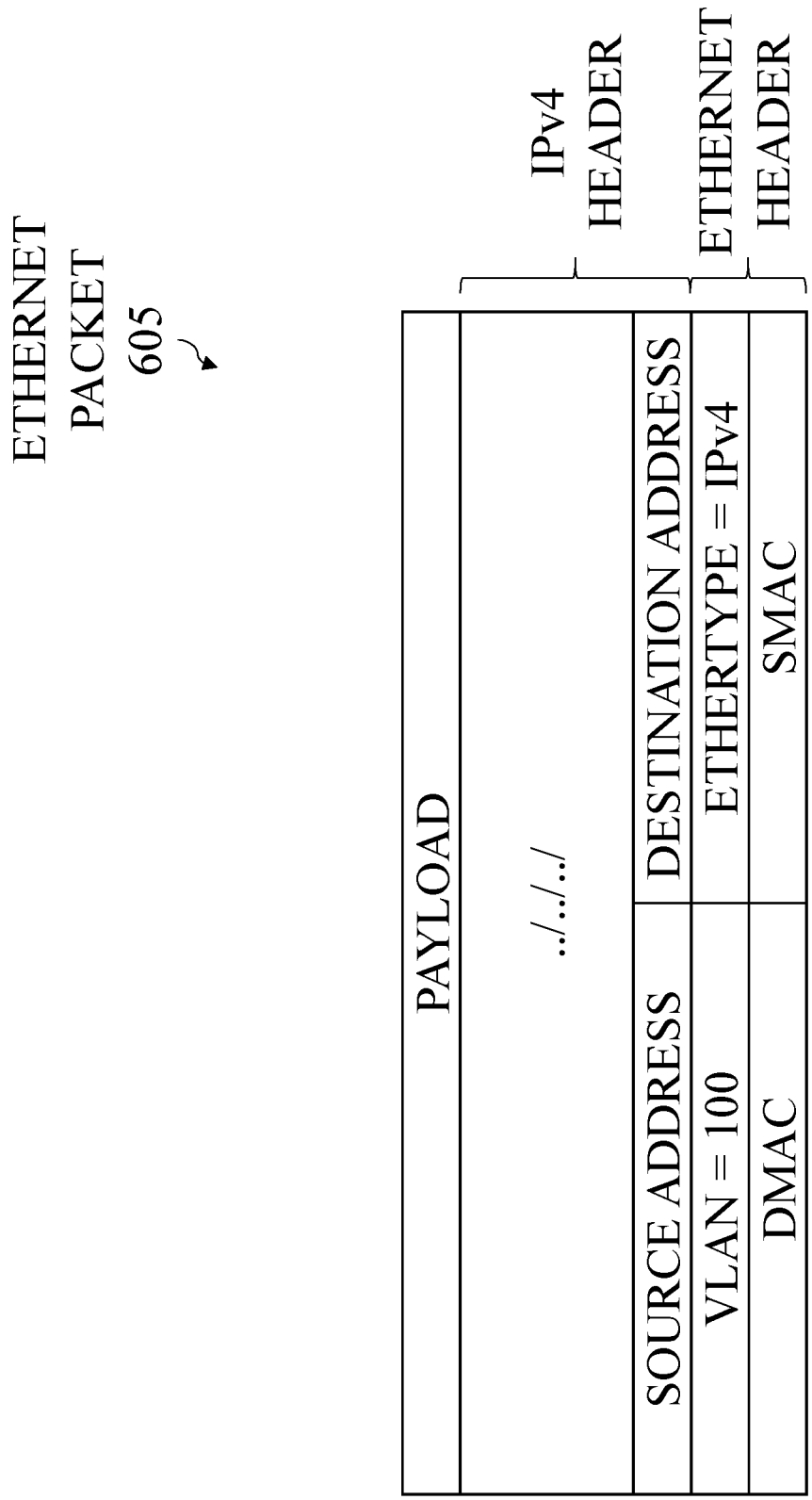

FIGS. 6A-6E depict example embodiments of packets and tables for supporting forwarding of Ethernet packets through the forwarding plane of the router chassis of FIG. 4 for delivery to a primary next-hop of the data packet flow as illustrated in FIG. 5. In this example, consider an Ethernet packet entering the router chassis 400 on port 3 of forwarding card 420-1. The Ethernet packet is Ethernet packet 601 of FIG. 6A. The packet processor in the ingress forwarding card 420-1 parses the Ethernet header in Ethernet packet 601 and determines that the Ethernet header includes a VLAN header for VLAN 100. The packet processor in the ingress forwarding card 420-1 then looks up the destination MAC (DMAC) address of the Ethernet header in the forwarding table of VLAN 100. The table entry for the DMAC address of the Ethernet header indicates that it is the local address of this router. So, the packet processor of the ingress forwarding card 420-1 removes the Ethernet header and processes the next header, which happens to be an IPv4 header (the EtherType field in the Ethernet header indicates the next header as IPv4). The ingress forwarding card 420-1 looks up the destination IP address 138.12.1.10 in the IP header of the packet in the IPv4 route table. The IPV4 route table is depicted as IPv4 route table 602 of FIG. 6B. As illustrated in FIG. 6B, the route prefix 138.12.1.0/24 for the destination IP address 138.12.1.10 has a primary next-hop associated therewith (port 15 on card 2) and also has a secondary (backup) next-hop associated therewith (port 11 on card N). The longest prefix matching IPv4 route table entry 138.12.1.0/24 indicates that the IPV4 packet needs to be sent out to the primary next-hop IPv4 address 10.10.10.2 through port 15 in the forwarding card 420-2. So, the packet processor in the ingress forwarding card 420-1 sends the IPv4 packet to forwarding card 420-2 via the SF 450 by adding an SF header to the IPV4 packet and putting the resulting packet on the SF 450. The SF header that is added to the IPV4 packet includes a first indication that the packet needs to be sent out to IP address 10.10.10.2 through port 15 in forwarding card 420-2 for the primary next-hop and a second indication that the secondary next-hop of the packet is 20.20.20.2 through port 11 in forwarding card 420-N. The packet including the SF header encapsulating the IPv4 packet is depicted as switch fabric packet 603 of FIG. 6C. The packet processor of the ingress forwarding card 420-1 sends the switch fabric packet 603 over the SF 450. The SF card 430 receives the switch fabric packet 603 and relays the switch fabric packet 603 to the packet processor of the forwarding card 420-2 via the SF 450. The packet processor of the forwarding card 420-2 receives the switch fabric packet 603, removes the SF header from the switch fabric packet 603 to recover the IPV4 packet, and looks up the IPv4 next-hop table for IPv4 address 10.10.10.2 of the primary next-hop to resolve the Ethernet header to be added to the IPV4 packet. The IPv4 next-hop table is depicted as IPv4 next-hop table 604 of FIG. 6D. The table entry for the IPv4 address 10.10.10.2 of the primary next-hop resolves to MAC address 0x0b:0x01:0x2:0x03:0x4:0x5 in VLAN 200. So, the packet processor of the forwarding card 420-2 pushes an Ethernet header onto the IPV4 packet to form an Ethernet packet, and provides the Ethernet packet to the transceiver of the forwarding card 420-2 for transmission on port 10 of forwarding card 420-2. The Ethernet header that is pushed includes VLAN 200 and the DMAC address in the Ethernet header encodes the MAC address 0x0b:0x01:0x2:0x03:0x4: 0x5 of IP address 10.10.10.2. The source MAC address (SMAC) is the local MAC address assigned to port 15. The Ethernet packet formed based on addition of the Ethernet header to the IPv4 packet is depicted as Ethernet packet 605 of FIG. 6E. The flow path of the Ethernet packet within the router chassis 400 is depicted as FP 501 in FIG. 5.

Figure 7:
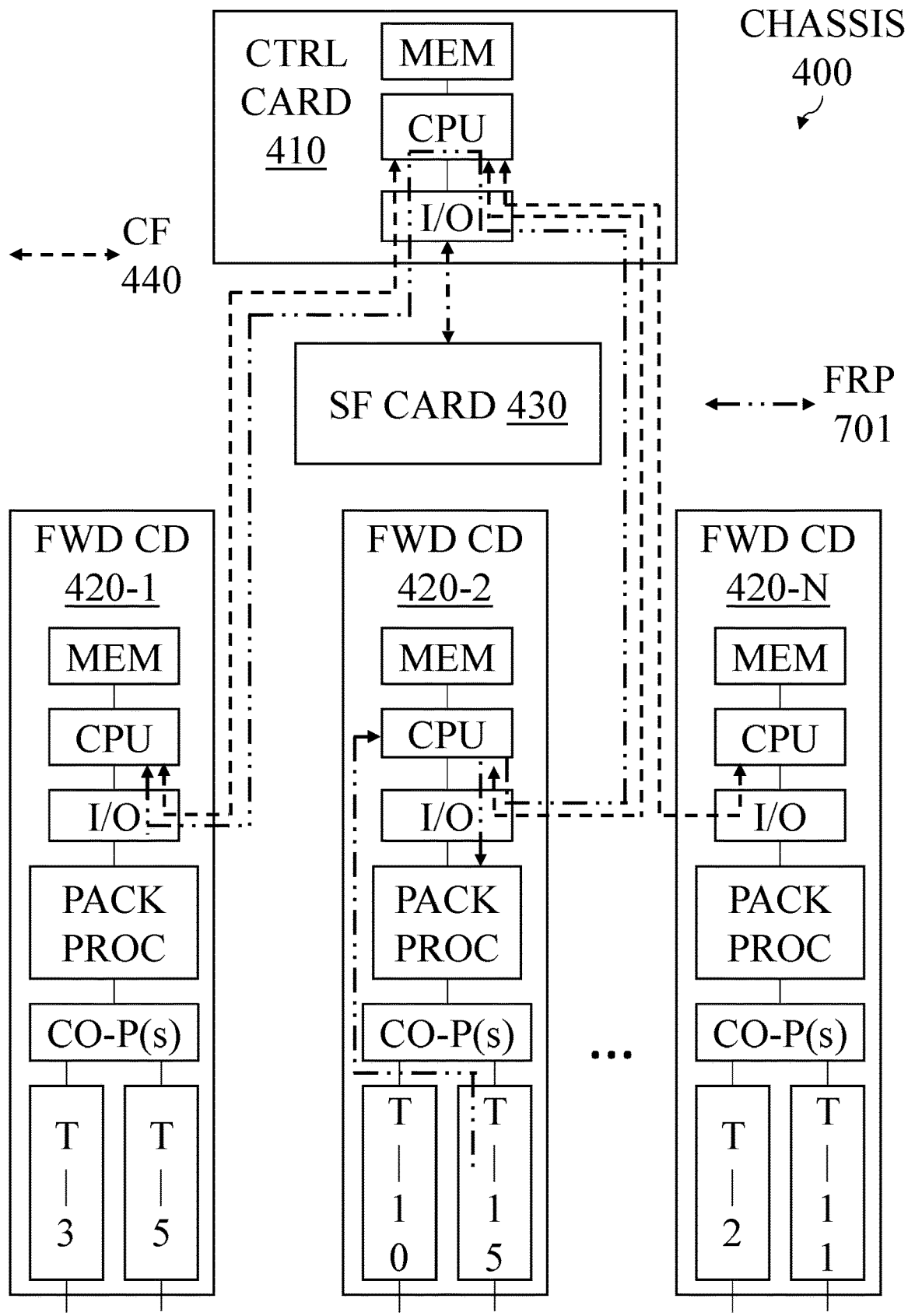
FIG. 7 depicts an example embodiment for communication of an inter-card control message through the control fabric of the router chassis of FIG. 4 based on detection of a failure associated with the data packet flow of FIG. 5.

FIG. 7 depicts an example embodiment for communication of an inter-card control message through the control fabric of the router chassis of FIG. 4 based on detection of a failure associated with the data packet flow of FIG. 5.

In FIG. 7, the CPU of the egress forwarding card 420-2 detects a failure associated with the transceiver T-15 of forwarding card 420-2 (which is the egress card for the data packet flow on FP 501 toward the primary next-hop). The failure associated with the transceiver T-15 of forwarding card 420-2 may be notified by the transceiver T-15 of forwarding card 420-2 to the CPU of forwarding card 420-2 through an I/O control bus with an interrupt. In FIG. 7, the detection and notification of the failure of port 15 is indicated by the failure reporting path (FRP) 701.

In FIG. 7, the CPU of the egress forwarding card 420-2 notifies the packet processor of the egress forwarding card 420-2 of the detected failure associated with the transceiver T-15 of the egress forwarding card 420-2 (e.g., software running in the CPU of the egress forwarding card 420-2 may notify the packet processor of the egress forwarding card 420-2 of the detected failure of port 15) so that the packet processor of the egress forwarding card 420-2 can initiate egress rerouting of data packets of the data packet flow that are still arriving from the ingress forwarding card 420-1 of the data packet flow since the failure has not yet been reported to the ingress forwarding card 420-1 of the data packet flow. The egress rerouting of data packets of the data packet flow by egress forwarding card 420-2 may be further understood by way of reference to FIG. 8 (which illustrates the new path of the data packet flow after egress rerouting is initiated) and FIGS. 9A-9F.

In FIG. 7, the CPU of the egress forwarding card 420-2 also notifies the control card 410 of the detected failure associated with the transceiver T-15 of forwarding card 420-2 through the CF 440 so that the control card 410 can notify the ingress forwarding card 420-1 of the detected failure of port 15 through the CF 440 to trigger ingress rerouting of data packets of the data packet flow by the ingress forwarding card 420-1. The notification of the failure associated with the transceiver T-15 of the egress forwarding card 420-2 may be notified from the CPU of the egress forwarding card 420-2 to the control card 410 and from the control card 410 to the CPU of the ingress forwarding card 420-1 using one or more inter-card control messages (e.g., one or more inter-card control messages encoding an indication of the failure). The ingress rerouting of data packets of the data packet flow by the ingress forwarding card 420-1 may be further understood by way of reference to FIG. 10 (which illustrates the new path of the data packet flow after ingress rerouting is initiated) and FIGS. 11A-11E.

It will be appreciated that, although primarily presented with respect to example embodiments in which the failure is detected by the CPU of the egress forwarding card, in at least some example embodiments the failure may be detected by the packet processor of the egress forwarding card (in which case the packet processor of the egress forwarding card may then initiate egress rerouting for the data packet flow and also may notify the CPU of the egress forwarding card of the failure so that the CPU of the egress forwarding card can initiate the process for notifying the ingress forwarding card of the failure to trigger activation of ingress rerouting for the data packet flow).

Figure 8:
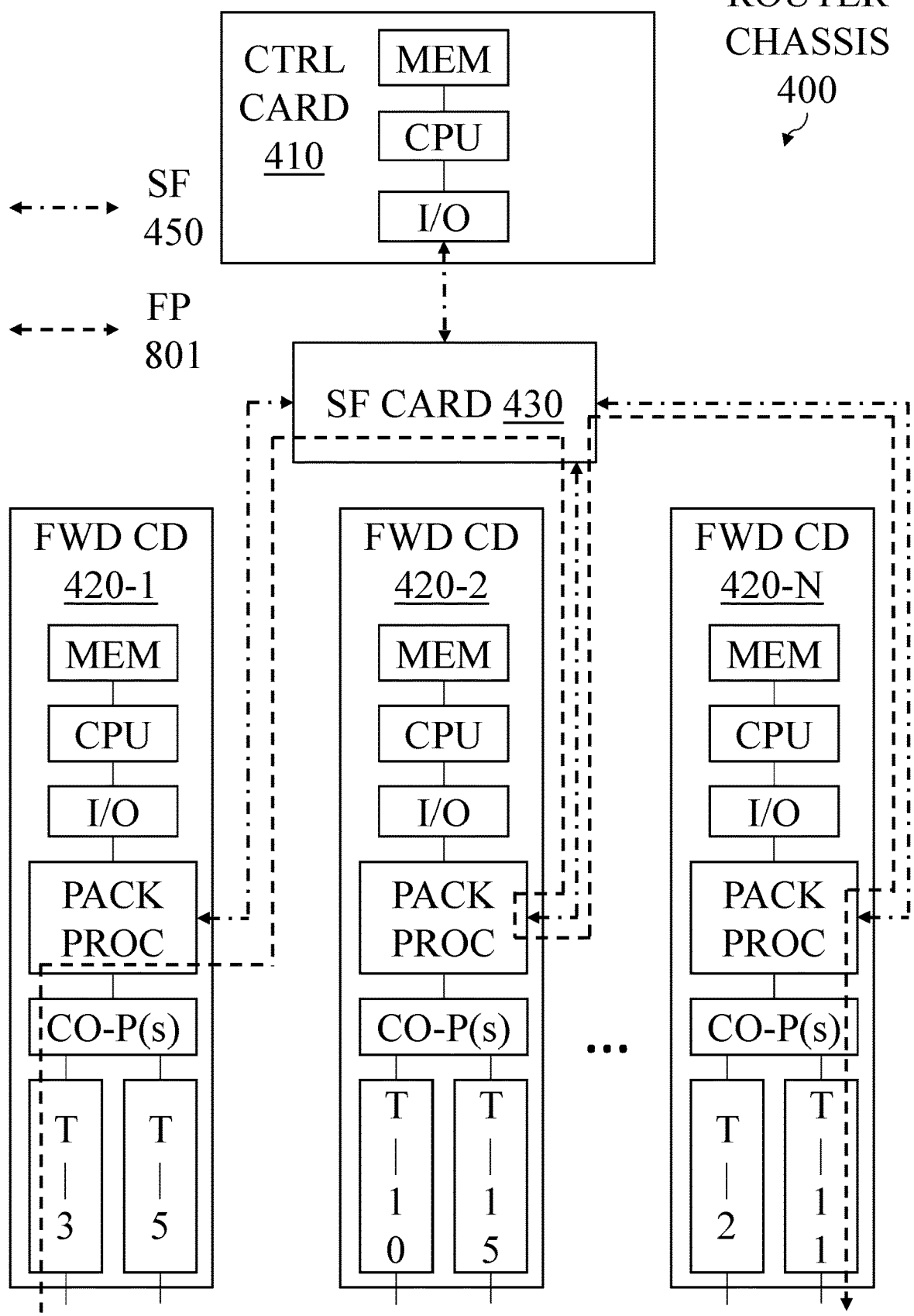
FIG. 8 depicts an example embodiment for egress rerouting of data packets of the data packet flow of FIG. 5 after the failure is detected by the egress forwarding card of the data packet flow of FIG. 5.

FIG. 8 depicts an example embodiment for egress rerouting of data packets of the data packet flow of FIG. 5 after the failure is detected by the egress forwarding card of the data packet flow of FIG. 5. In FIG. 8, the router chassis 400 of FIG. 4 is depicted. The router chassis 400 is supporting a data packet flow along a flow path (FP) 801. The FP 801 is a secondary flow path which results after egress rerouting is activated by the egress forwarding card 420-2 associated with the primary next-hop for the data packet flow based on detection of a failure associated with the primary next-hop of the data packet flow. The FP 801 includes egress rerouting of data packets of the data packet flow from the egress forwarding card 420-2 associated with the primary next-hop for the data packet flow to the egress forwarding card 420-N associated with the secondary next-hop for the data packet flow. For the data packet flow on FP 801, packets enter the router chassis 400 on port 3 of card 1 (illustratively, on transceiver T-3 of forwarding card 420-1, which is the ingress card for the data packet flow on FP 801) and leave the router chassis 400 on port 11 of card N (illustratively, on transceiver T-11 of forwarding card 420-N, which is the secondary egress card for the data packet flow on FP 801). For the data packet flow on FP 801, on the ingress forwarding card 420-1, the packets are received at the transceiver T-3 over the wire into the router chassis 400 and provided from the transceiver T-3 through the co-processors on the ingress card to the packet processor on the ingress forwarding card 420-1. For the data packet flow on FP 801, the packets are transported from the packet processor on the ingress forwarding card 420-1 to the packet processor on the primary egress forwarding card 420-2 via the SF 450 since, even though there is a failure associated with the primary next-hop of the data packet flow, the ingress forwarding card 420-1 is not yet aware of the failure associated with the primary next-hop of the data packet flow. For the data packet flow on FP 801, on the primary egress forwarding card 420-2, the packets, rather than being routed from the packet processor on the primary egress forwarding card 420-2 through the co-processors on the primary egress forwarding card 420-2 to the transceiver T-15 for transmission on the wire out of the router chassis 400 toward the primary next-hop for the data packet flow, are rerouted by the primary egress forwarding card 420-2 toward the secondary egress forwarding card 420-N via the SF 450. For the data packet flow on FP 801, the packets are transported from the packet processor on the primary egress forwarding card 420-2 to the packet processor on the secondary egress forwarding card 420-N via the SF 450. For the data packet flow on FP 801, on the secondary egress forwarding card 420-N, the packets are routed from the packet processor through the co-processors on the secondary egress forwarding card 420-N to the transceiver T-11 for transmission on the wire out of the router chassis 400 toward the secondary next-hop for the data packet flow. It will be appreciated that forwarding of packets through the router chassis 400 of FIG. 8 using FP 801 may be further understood by way of reference to the following example described with respect to the packet formats and information tables of FIGS. 9A-9F.

Figure 9A:
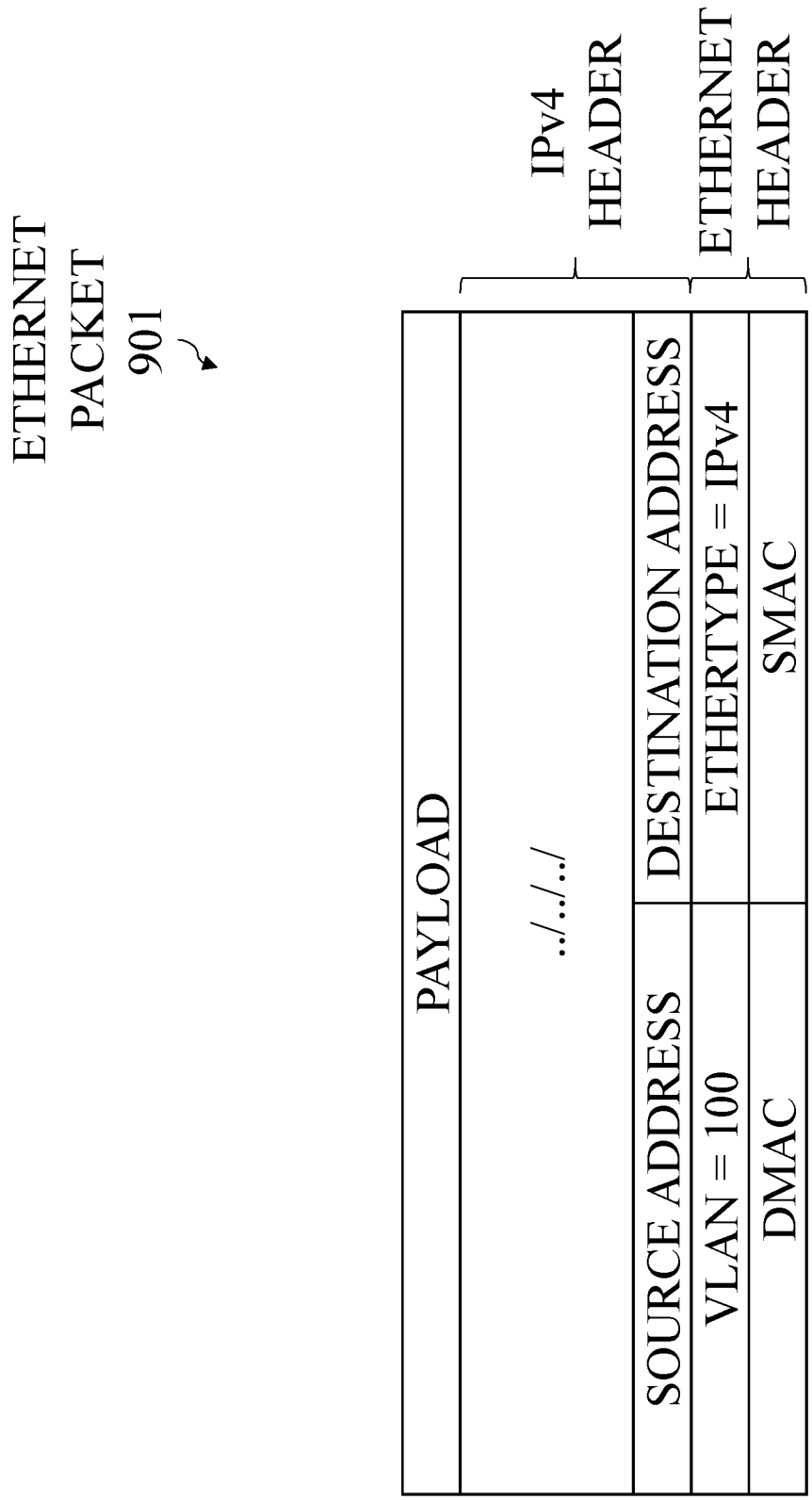
Figure 9C:
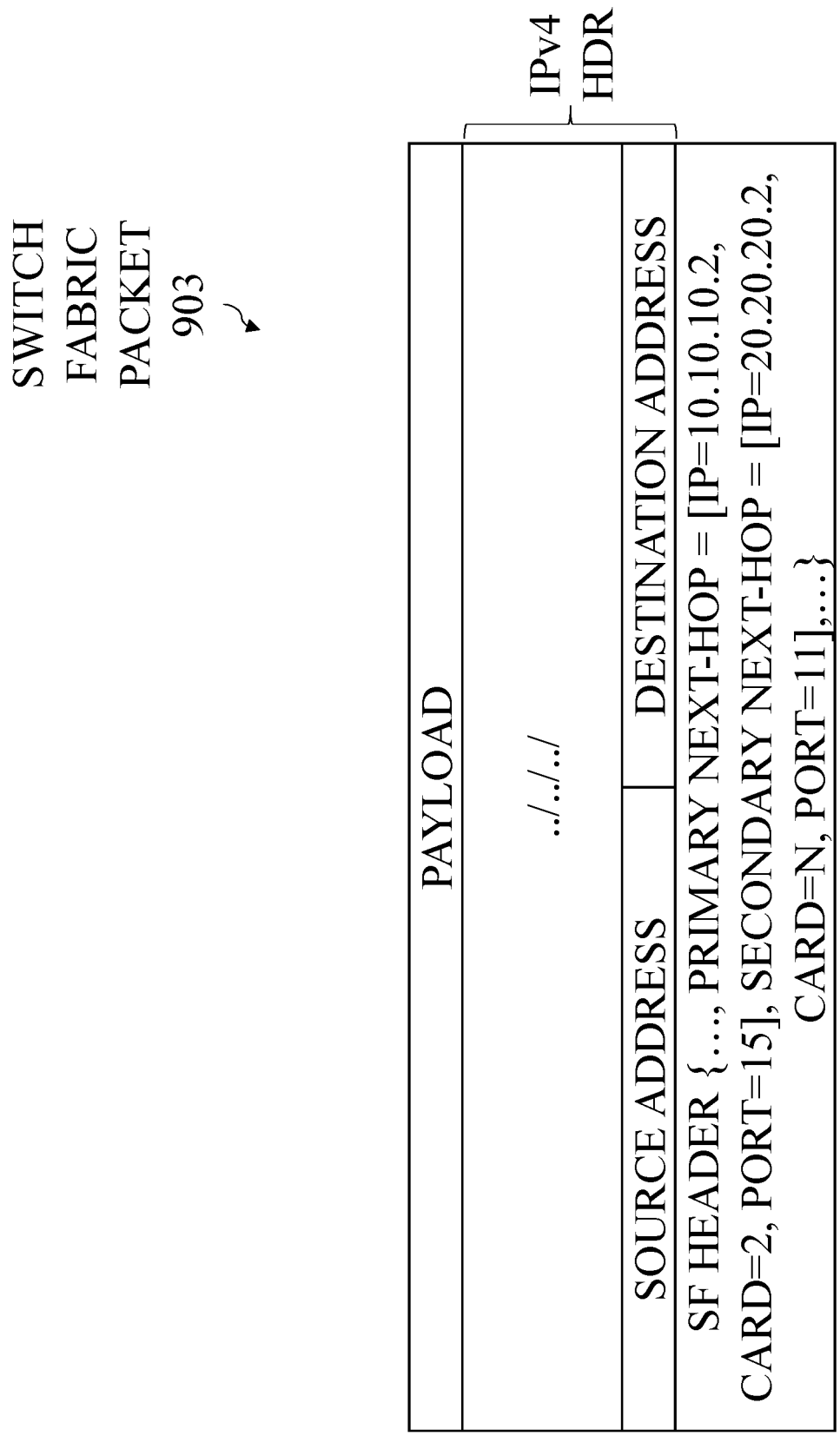
Figure 9D:
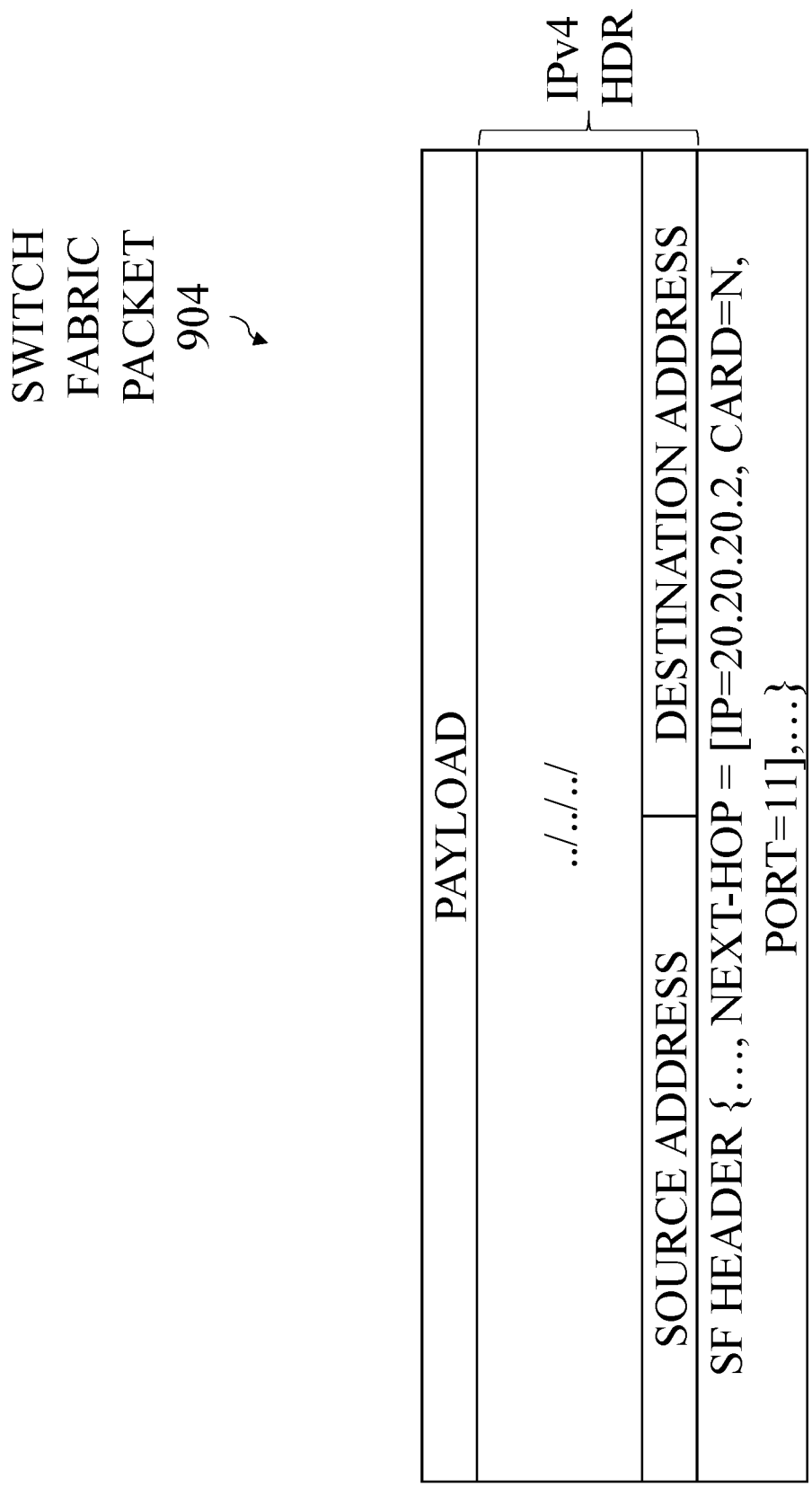
Figure 9F:
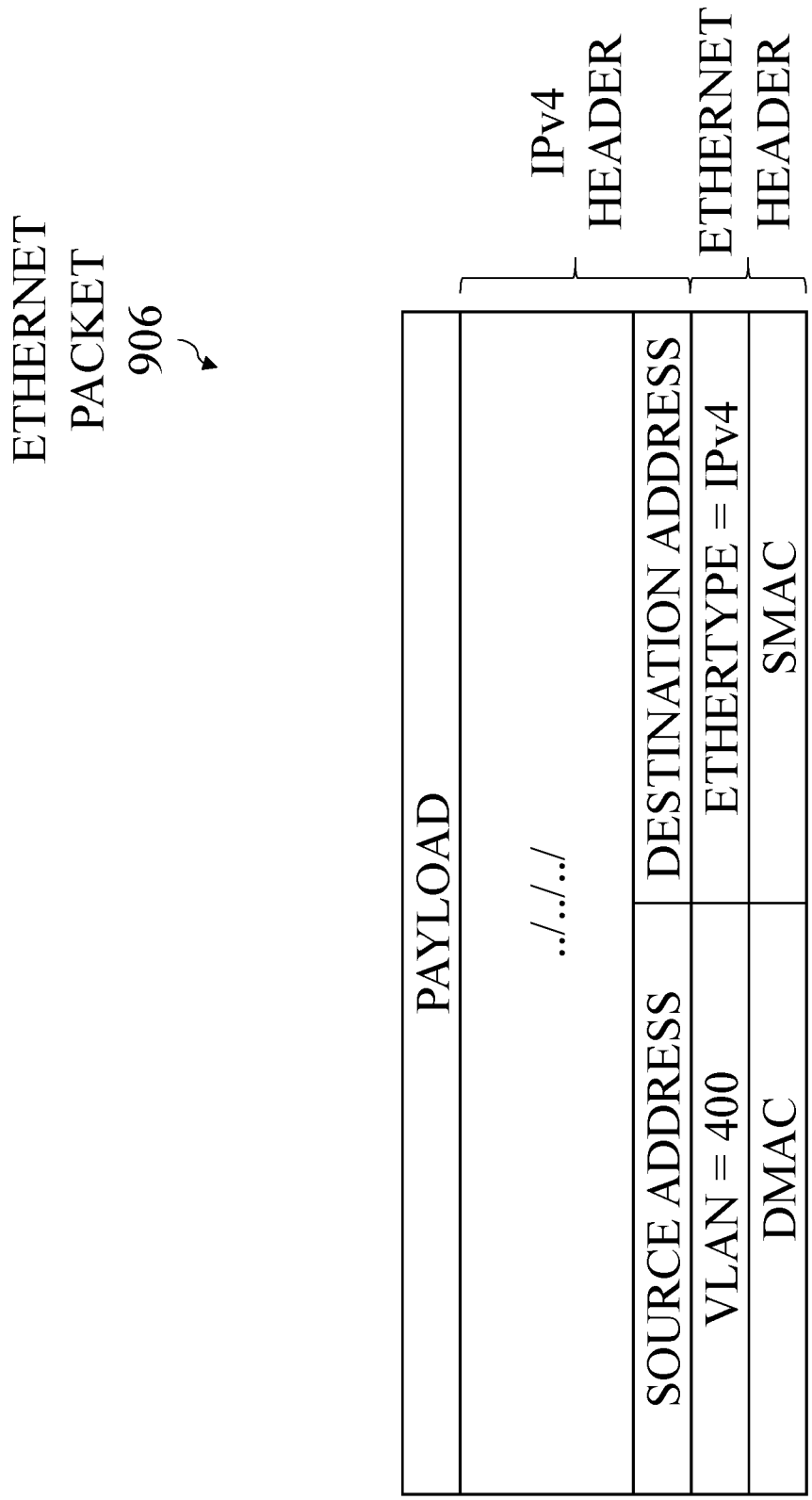

FIGS. 9A-9F depict example embodiments of packets and tables for supporting forwarding of Ethernet packets through the forwarding plane of the router chassis of FIG. 4 for delivery to the secondary next-hop of the data packet flow based on egress rerouting as illustrated in FIG. 8. In this example, assume that a failure associated with the primary next-hop for the destination IP address 138.12.1.10 has been detected and reported to the packet processor on the primary egress forwarding card 420-2 (e.g., as presented with respect to FIG. 7). In this example, consider an Ethernet packet entering the router chassis 400 on port 3 of forwarding card 420-1. The Ethernet packet is Ethernet packet 901 of FIG. 9A. The packet processor in the ingress forwarding card 420-1 parses the Ethernet header in Ethernet packet 901 and determines that the Ethernet header includes a VLAN header for VLAN 100. The packet processor in the ingress forwarding card 420-1 then looks up the destination MAC (DMAC) address of the Ethernet header in the forwarding table of VLAN 100. The table entry for the DMAC address of the Ethernet header indicates that it is the local address of this router. So, the packet processor of the ingress forwarding card 420-1 removes the Ethernet header and processes the next header, which happens to be an IPV4 header (the EtherType field in the Ethernet header indicates the next header as IPv4). The ingress forwarding card 420-1 looks up the destination IP address 138.12.1.10 in the IPv4 header in the IPV4 route table. The IPV4 route table is depicted as IPv4 route table 902 of FIG. 9B. As illustrated in FIG. 9B, the route prefix 138.12.1.0/24 for the destination IP address 138.12.1.10 has a primary next-hop associated therewith (port 15 on card 2) and also has a secondary (backup) next-hop associated therewith (port 11 on card N). The longest prefix matching IPv4 route table entry 138.12.1.0/24 indicates that the IPv4 packet needs to be sent out to the primary next-hop IPv4 address 10.10.10.2 through port 15 in the forwarding card 420-2 (again, since the failure notification has not yet been received by the ingress forwarding card 420-1). So, the packet processor in the ingress forwarding card 420-1 sends the IPv4 packet to forwarding card 420-2 via the SF 450 by adding an SF header to the IPv4 packet and putting the resulting packet on the SF 450. The SF header that is added to the IPV4 packet includes a first indication that the packet needs to be sent out to IP address 10.10.10.2 through port 15 in forwarding card 420-2 and a second indication that the secondary next-hop of the packet is 20.20.20.2 through port 11 in forwarding card 420-N. The packet including the SF header encapsulating the IPV4 packet is depicted as switch fabric packet 903 of FIG. 9C. The packet processor of the ingress forwarding card 420-1 sends the switch fabric packet 903 over the SF 450. The SF card 430 receives the switch fabric packet 903 and relays the switch fabric packet 903 to the packet processor of the forwarding card 420-2 via the SF 450. The packet processor of the forwarding card 420-2 receives the switch fabric packet 903, removes the SF header from the switch fabric packet 903 to recover the IPv4 packet, and looks up the IPv4 next-hop table for IPV4 address 10.10.10.2 to resolve the Ethernet header to be added to the IPV4 packet. The packet processor of the forwarding card 420-2 determines that the primary next-hop for the IPV4 packet is not available and initiates an egress reroute of the IPv4 packet toward the secondary next-hop for the IPv4 packet. The packet processor of the forwarding card 420-2 determines the secondary next-hop information for the egress reroute operation from the SF header of the switch fabric packet 903. The secondary next-hop information for the IPV4 packet indicates that the IPV4 packet needs to be sent out to the secondary next-hop IPV4 address 20.20.20.2 through port 11 in the forwarding card 420-N. So, the packet processor in forwarding card 420-2 reroutes the IPV4 packet to forwarding card 420-N via the SF 450 by adding a new SF header to the IPV4 packet and putting the resulting packet on the SF 450. The new SF header that is added to the IPV4 packet includes an indication that the next-hop of the packet is 20.20.20.2 through port 11 in forwarding card 420-N. The packet including the new SF header encapsulating the IPV4 packet is depicted as switch fabric packet 904 of FIG. 9D. The packet processor of the forwarding card 420-2 sends the switch fabric packet 904 over the SF 450. The SF card 430 receives the switch fabric packet 904 and relays the switch fabric packet 904 to the packet processor of the forwarding card 420-N via the SF 450. The packet processor of the forwarding card 420-N receives the switch fabric packet 904, removes the SF header from the switch fabric packet 904 to recover the IPv4 packet, and looks up the IPv4 next-hop table for IPv4 address 20.20.20.2 to resolve the Ethernet header to be added to the IPv4 packet. The IPv4 next-hop table is depicted as IPv4 next-hop table 905 of FIG. 9E. The table entry for IPV4 address 20.20.20.2 resolves to MAC address 0x0b:0x01: 0x2:0x03:0x4:0x5 in VLAN 400. So, the packet processor of the forwarding card 420-N pushes an Ethernet header onto the IPV4 packet to form an Ethernet packet, and provides the Ethernet packet to the transceiver of the forwarding card 420-N for transmission on port 10 of forwarding card 420-2. The Ethernet header that is pushed includes VLAN 400 and the DMAC address in the Ethernet header encodes the MAC address 0x0b:0x01:0x2:0x03:0x4:0x5 of IP address 20.20.20.2. The source MAC address (SMAC) is the local MAC address assigned to port 11. The Ethernet packet formed based on addition of the Ethernet header to the IPv4 packet is depicted as Ethernet packet 906 of FIG. 9F. The flow path of the Ethernet packet within the router chassis 400 is depicted as FP 801 in FIG. 8.

Figure 10:
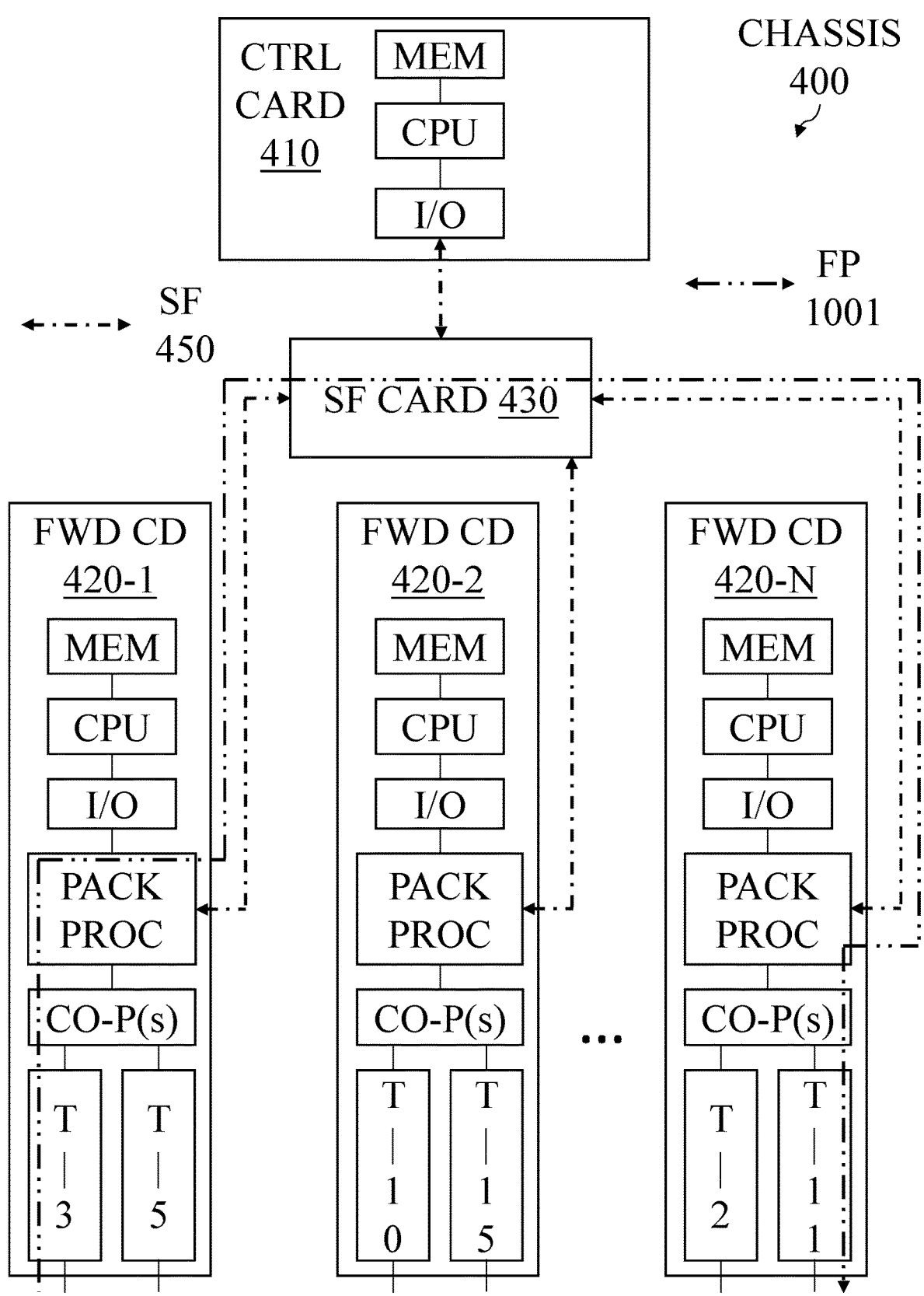
FIG. 10 depicts an example embodiment for ingress rerouting of data packets of the data packet flow of FIG. 5 after the failure is detected by the ingress forwarding card of the data packet flow of FIG. 5.

FIG. 10 depicts an example embodiment for ingress rerouting of data packets of the data packet flow of FIG. 5 after the failure is detected by the ingress forwarding card of the data packet flow of FIG. 5. In FIG. 10, the router chassis 400 of FIG. 4 is depicted. The router chassis 400 is supporting a packet flow along a flow path (FP) 1001. The FP 1001 is a secondary flow path which results after ingress rerouting is activated by the ingress forwarding card 420-1 associated with the data packet flow based on detection of a failure associated with the primary next-hop of the data packet flow. The FP 1001 includes ingress rerouting of data packets of the data packet flow from the ingress forwarding card 420-1 associated with the data packet flow to the egress forwarding card 420-N associated with the secondary next-hop for the data packet flow. For the data packet flow on FP 1001, packets enter the router chassis 400 on port 3 of card 1 (illustratively, on transceiver T-3 of forwarding card 420-1, which is the ingress card for the data packet flow on FP 1001) and leave the router chassis 400 on port 11 of card N (illustratively, on transceiver T-11 of forwarding card 420-N, which is the secondary egress card for the data packet flow on FP 1001). For the data packet flow on FP 1001, on the ingress forwarding card 420-1, the packets are received at the transceiver T-3 over the wire into the router chassis 400 and provided from the transceiver T-3 through the co-processors on the ingress forwarding card 420-1 to the packet processor on the ingress forwarding card 420-1. For the data packet flow on FP 1001, the packets are transported from the packet processor on the ingress forwarding card 420-1 to the packet processor on the secondary egress forwarding card 420-N via the SF 450 since the ingress forwarding card 420-1 is now aware of the failure associated with the primary next-hop of the data packet flow (thereby obviating the need for the primary egress forwarding card 420-2 to continue performing egress rerouting for data packets even though this egress rerouting advantageously prevented dropping of packets that otherwise would have been dropped between the time that the primary egress forwarding card 420-2 becomes aware of the failure and the time that the ingress forwarding card 420-1 becomes aware of the failure). For the data packet flow on FP 1001, on the secondary egress forwarding card 420-N, the packets are routed from the packet processor through the co-processors on the secondary egress forwarding card 420-N to the transceiver T-11 for transmission on the wire out of the router chassis 400 toward the secondary next-hop for the data packet flow. It will be appreciated that forwarding of packets through the router chassis 400 of FIG. 4 using FP 1001 may be further understood by way of reference to the following example described with respect to the packet formats and information tables of FIGS. 11A-11E.

Figure 11A:
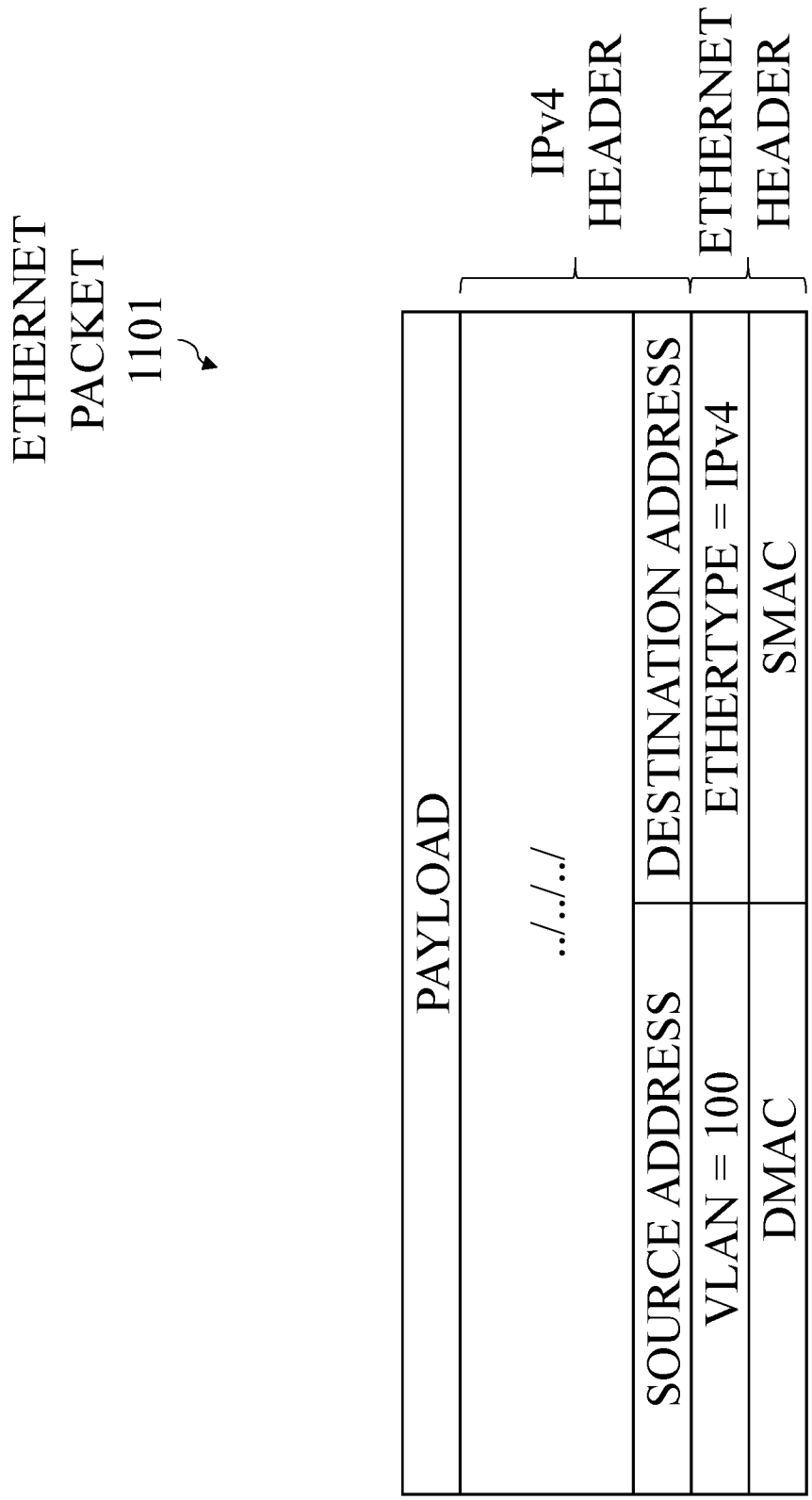
Figure 11C:
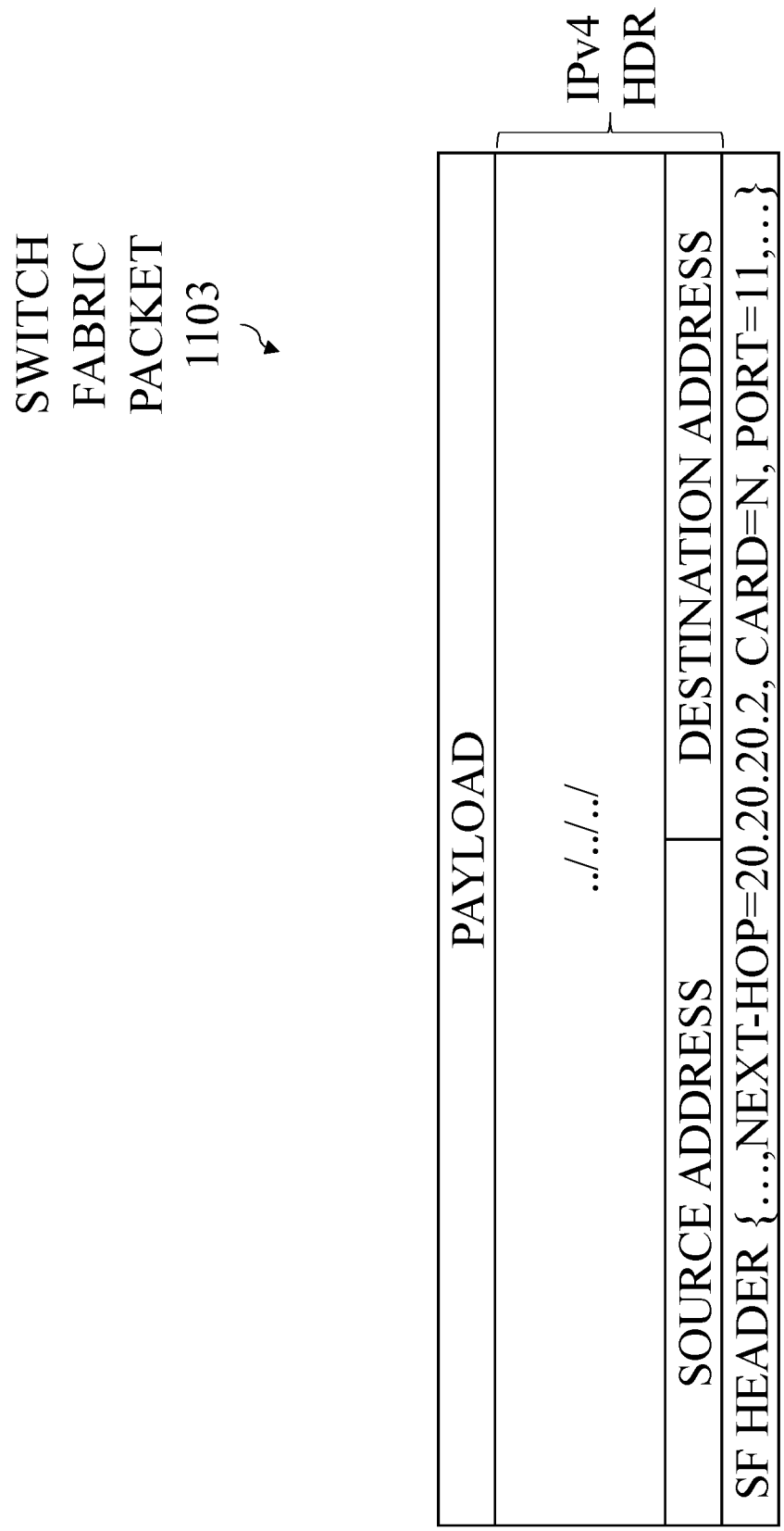

FIGS. 11A-11E depict example embodiments of packets and tables for supporting forwarding of Ethernet packets through the forwarding plane of the router chassis of FIG. 4 for delivery to the secondary next-hop of the data packet flow based on ingress rerouting as illustrated in FIG. 10. In this example, assume that a failure associated with the primary next-hop for the destination IP address 138.12.1.10 has been detected and reported to the packet processor on the ingress forwarding card 420-1 (e.g., as presented with respect to FIG. 7). The packet processor on the ingress forwarding card 420-1 will reroute packets intended for the destination IP address 138.12.1.10 to the secondary next-hop indicated for the destination IP address 138.12.1.10. Here, assume that a new Ethernet packet enters the router chassis 400 on port 3 of forwarding card 420-1. The Ethernet packet is Ethernet packet 1101 of FIG. 11A. The packet processor in the ingress forwarding card 420-1 parses the Ethernet header in Ethernet packet 1101 and determines that the Ethernet header includes a VLAN header for VLAN 100. The packet processor in the ingress forwarding card 420-1 then looks up the destination MAC (DMAC) address of the Ethernet header in the forwarding table of VLAN 100. The table entry for the DMAC address of the Ethernet header indicates that it is the local address of this router. So, the packet processor of the ingress forwarding card 420-1 removes the Ethernet header and processes the next header, which happens to be an IPV4 header (the EtherType field in the Ethernet header indicates the next header as IPv4). The ingress forwarding card 420-1 looks up the destination IP address 138.12.1.10 in the IP header of the packet in the IPV4 route table. The IPV4 route table is depicted as IPv4 route table 1102 of FIG. 11B. As illustrated in FIG. 11B, the route prefix 138.12.1.10/24 for the destination IP address 138.12.1.10 has a secondary next-hop associated therewith (IP address 20.20.20.2 via port 11 on card N), which is the next-hop that is used due to the failure associated with the primary next-hop. The longest prefix matching IPv4 route table entry 138.12.1.0/24 indicates that the IPV4 packet needs to be sent out to the secondary next-hop IPv4 address 20.20.20.2 through port 11 in the forwarding card 420-N. So, the packet processor in the ingress forwarding card 420-1 sends the IPV4 packet to forwarding card 420-N via the SF 450 by adding an SF header to the IPv4 packet and putting the resulting packet on the SF 450. The SF header that is added to the IPV4 packet includes an indication that the IPV4 packet needs to be sent out to secondary next-hop IPv4 address 20.20.20.2 through port 11 in forwarding card 420-N. The packet including the SF header encapsulating the IPV4 packet is depicted as switch fabric packet 1103 of FIG. 11C. The packet processor of the ingress forwarding card 420-1 sends the switch fabric packet 1103 over the SF 450. The SF card 430 receives the switch fabric packet 1103 and relays the switch fabric packet 1103 to the packet processor of the forwarding card 420-N via the SF 450. The packet processor of the forwarding card 420-N receives the switch fabric packet 1103, removes the SF header from the switch fabric packet 1103 to recover the IPV4 packet, and looks up the IPV4 next-hop table for IPV4 address 20.20.20.2 to resolve the Ethernet header to be added to the IPV4 packet. The IPv4 next-hop table is depicted as IPv4 next-hop table 1104 of FIG. 11D. The table entry for IPV4 address 20.20.20.2 resolves to MAC address 0x0b:0x01:0x2:0x03:0x4:0x5 in VLAN 400. So, the packet processor of the forwarding card 420-N pushes an Ethernet header onto the IPV4 packet to form an Ethernet packet, and provides the Ethernet packet to the transceiver of the forwarding card 420-N for transmission on port 11 of forwarding card 420-N. The Ethernet header that is pushed includes VLAN 400 and the DMAC address in the Ethernet header encodes the MAC address 0x0b:0x01:0x2:0x03:0x4:0x5 of IPV4 address 20.20.20.2. The source MAC address (SMAC) is the local MAC address assigned to port 11. The Ethernet packet formed based on addition of the Ethernet header to the IPV4 packet is depicted as Ethernet packet 1105 of FIG. 11E. The rerouted flow path of the Ethernet packet within the router chassis 400 is depicted as FP 1001 in FIG. 10.

It will be appreciated, at least from the example embodiments presented above and as explained further below, that egress rerouting, although consuming additional bandwidth on the switch fabric of the router chassis, advantageously prevents dropping of packets that otherwise would have been dropped between the time that the primary egress forwarding card of the data flow becomes aware of the failure and the time that the ingress forwarding card of the data flow becomes aware of the failure.

Figure 12:
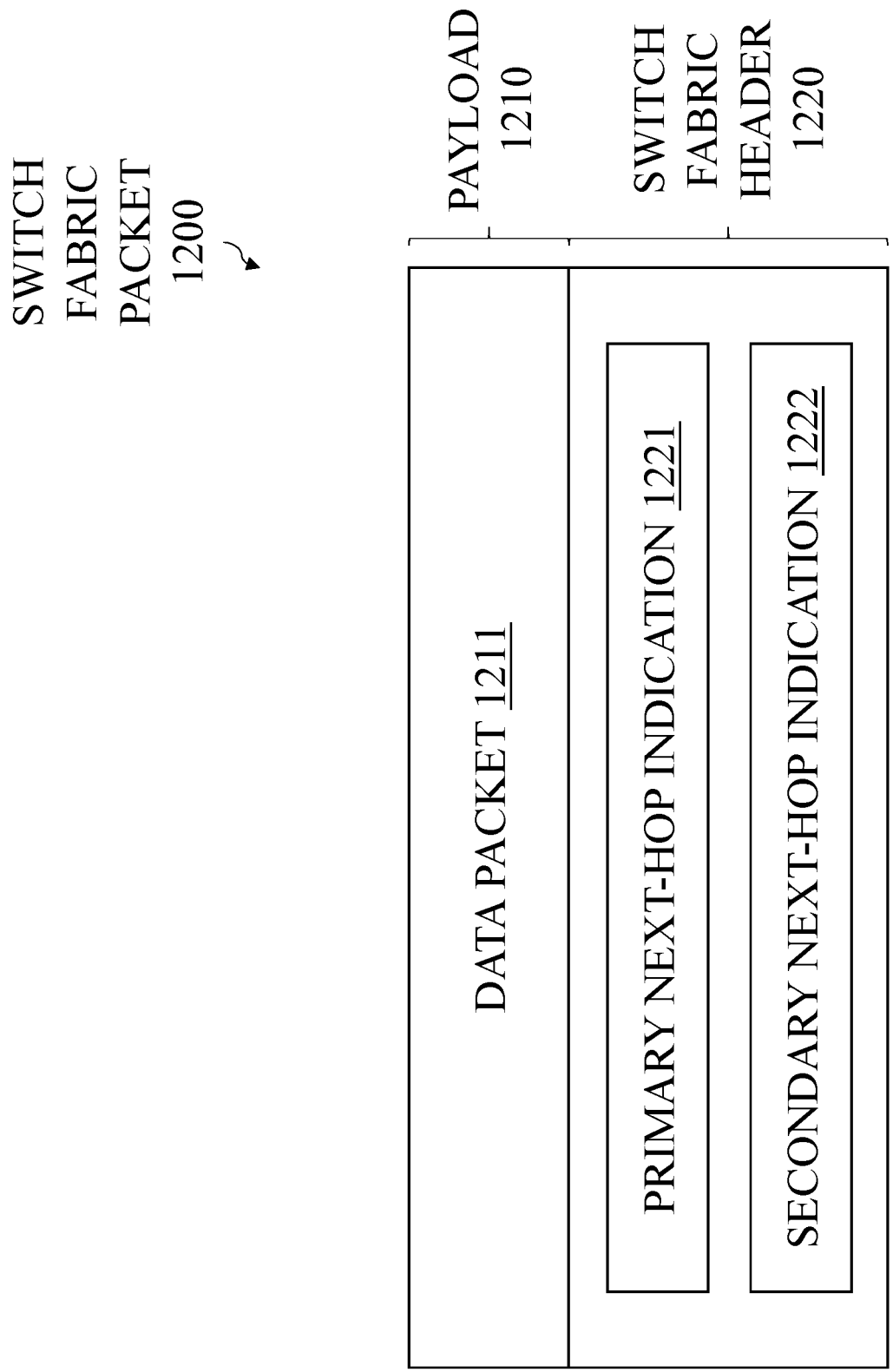
FIG. 12 depicts an example embodiment of a switch fabric packet configured to support egress rerouting.

FIG. 12 depicts an example embodiment of a switch fabric packet configured to support egress rerouting. As depicted in FIG. 12, the switch fabric packet 1200 includes a payload 1210 and a switch fabric header 1220. The payload 1210 includes a data packet 1211 being transported over the switch fabric based on the switch fabric header 1220. The switch fabric header 1220 includes a primary next-hop indication 1221 and a secondary next-hop indication 1222. The primary next-hop indication 1221 may be used by the primary egress forwarding card for normal forwarding of the payload 1210 toward a primary next-hop via the primary egress forwarding card where the primary next-hop is available. The secondary next-hop indication 1222 may be used by the primary egress forwarding card for egress rerouting of the payload 1210 toward a secondary next-hop via a secondary egress forwarding card where the primary next-hop is unavailable. It will be appreciated that use of the switch fabric packet 1200 to support egress rerouting may be further understood by way of reference to the example embodiments provided above and below.

Figure 13:
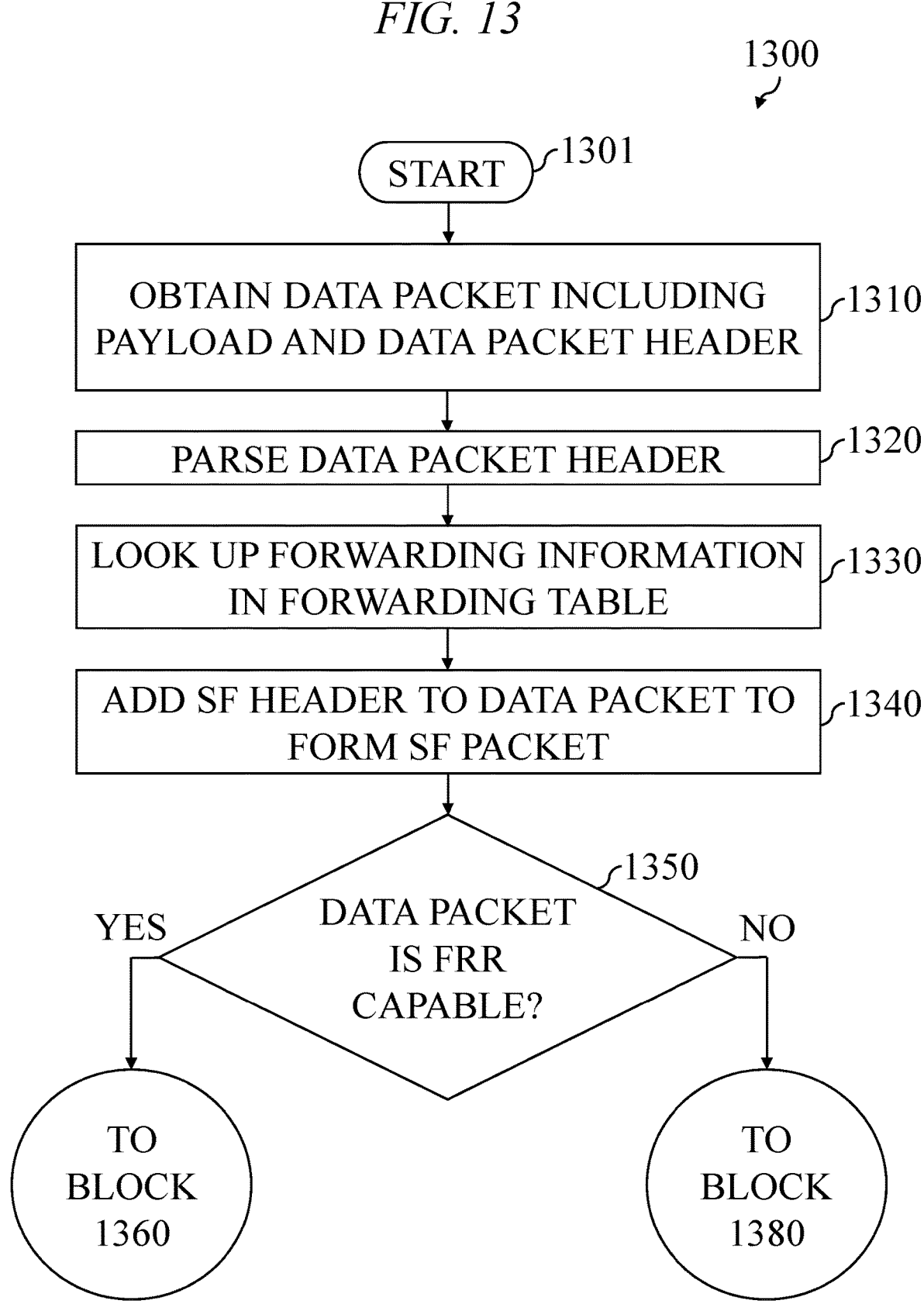
FIG. 13 depicts an example embodiment of a method for use by an ingress forwarding card of a router chassis to forward a data packet where the router chassis supports egress rerouting.

FIG. 13 depicts an example embodiment of a method for use by an ingress forwarding card of a router chassis to forward a data packet where the router chassis supports egress rerouting. It will be appreciated that, although primarily presented herein as being performed serially, at least a portion of the functions of method 1300 may be performed contemporaneously or in a different order than as presented in FIG. 13.

At block 1301, the method 1300 begins.

At block 1310, a data packet is obtained. The data packet is an ingress data packet received at the ingress forwarding card of the router chassis. The ingress data packet includes a payload and a data packet header.

At block 1320, the data packet header is parsed. The data packet header may be parsed by parsing one or more header fields of the data packet header (e.g., one or more header fields on which the forwarding decision is to be made). The parsing of the data packet header may include stripping off one or more headers of the data packet header. The parsing of the data packet header results in identification of the top-most header (potentially after removal of one or more headers).

At block 1330, forwarding information is determined from a forwarding table based on a lookup into the forwarding table. The lookup into the forwarding table to obtain the forwarding information is based on the parsing of the data packet header (e.g., using the top most header of the data packet). For example, if the topmost header is an Ethernet header, the DMAC address of the header is looked up in a MAC forwarding table to find the next-hop port. For example, if the topmost header is an MPLS label, the label is looked up in the Incoming Label Map (ILM) to find the labelled next-hop (e.g., the Next-Hop Label Forwarding Entry (NHLFE)). For example, if the topmost header is a BIER header, the bits set in the BIER header are looked up in the Bitmap Forwarding Table to find the list of next-hops. For example, if the topmost header is an IPv4 header, the destination address in the IPV4 header is looked up in an IPV4 route table to find the IPv4 next-hop. For example, if the topmost header is an IPV6 header, the destination address is looked up in an IPV6 route table to find the IPV6 next-hop. It will be appreciated that other types of lookups may be performed for other protocols.

At block 1340, a switch fabric header is added to the data packet to form a switch fabric packet. The switch fabric header is configured to support transport of the data packet from the ingress forwarding card to an egress forwarding card via the switch fabric of the router chassis.

At block 1350, a determination is made as to whether the data packet is fast-reroute (FRR) capable. The determination as to whether the data packet is FRR capable may be based on information from the matching forwarding table for the data packet (e.g., where the matching forwarding table is programmed with primary next-hop information and secondary next-hop information), information encoded within the data packet (e.g., where the data packet is a source routed packet that has encoded therein the primary next-hop information and the secondary next-hop information). If a determination is made that the data packet is FRR capable then the method 1300 proceeds to block 1360. If a determination is made that the data packet is not FRR capable then the method 1300 proceeds to block 1380.

At block 1360, the forwarding information for the primary next-hop for the data packet is indicated in the switch fabric header. The forwarding information for the primary next-hop for the data packet may be encoded within the switch fabric header using one or more fields.

At block 1370, the forwarding information for the secondary next-hop for the data packet is indicated in the switch fabric header. The forwarding information for the secondary next-hop for the data packet may be encoded within the switch fabric header using one or more fields.

At block 1380, the forwarding information for the next-hop for the data packet is indicated in the switch fabric header. The forwarding information for the next-hop for the data packet may be encoded within the switch fabric header using one or more fields.

At block 1390, the switch fabric packet is sent to the switch fabric. The switch fabric packet is sent over the switch fabric to the egress forwarding card which is the egress point for the next-hop for the data (e.g., the primary next-hop where the data packet is FRR capable or simply the next-hop where the data packet is not FRR capable).

At block 1399, the method 1300 ends.

It will be appreciated that various other functions presented herein may be implemented within the context of the method 1300 of FIG. 13.

Figure 14:
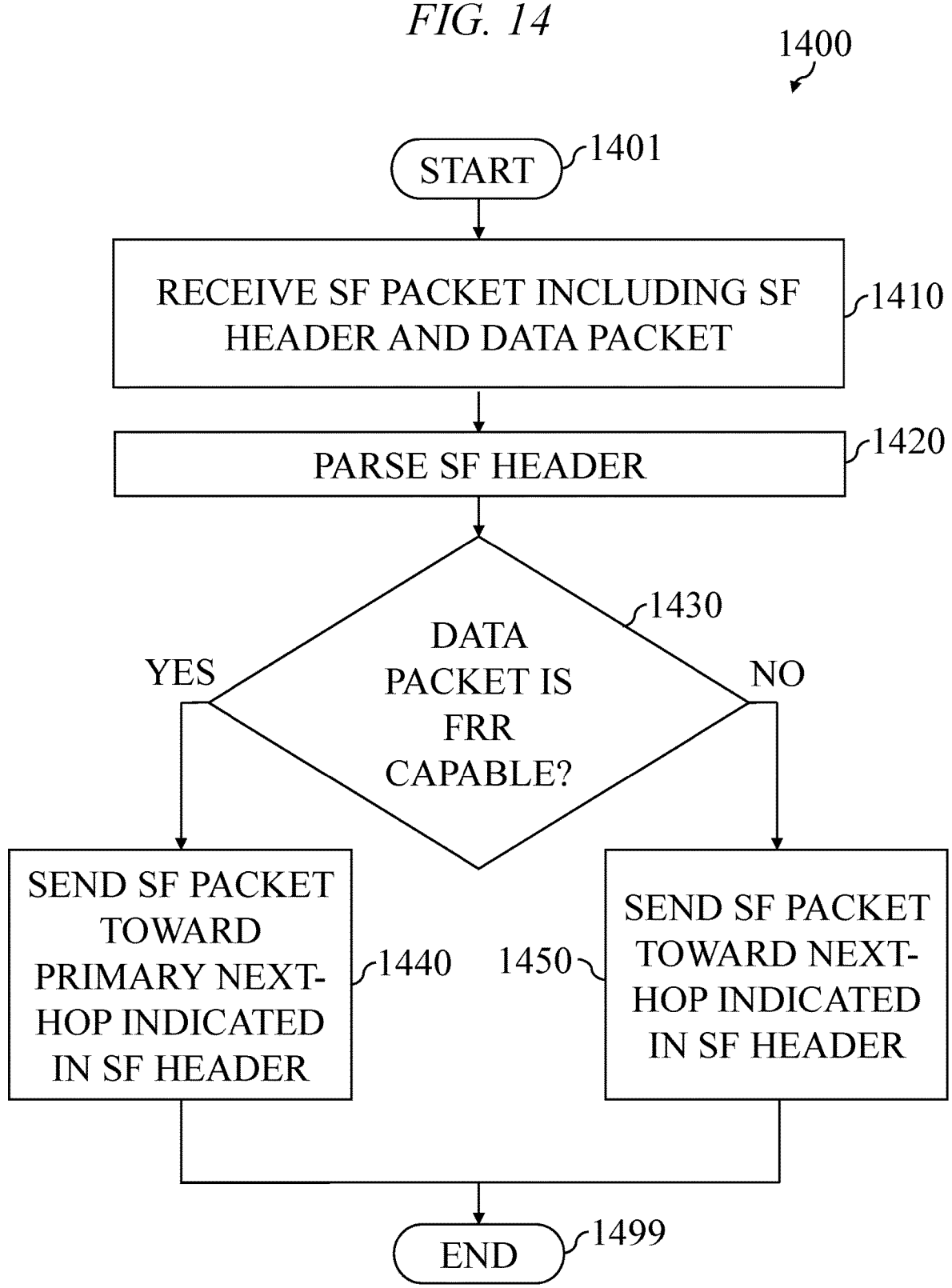
FIG. 14 depicts an example embodiment of a method for use by a switch fabric of a router chassis to forward a data packet from an ingress forwarding card of the router chassis to an egress forwarding card of the router chassis where the router chassis supports egress rerouting.

FIG. 14 depicts an example embodiment of a method for use by a switch fabric of a router chassis to forward a data packet from an ingress forwarding card of the router chassis to an egress forwarding card of the router chassis where the router chassis supports egress rerouting. It will be appreciated that, although primarily presented herein as being performed serially, at least a portion of the functions of method 1400 may be performed contemporaneously or in a different order than as presented in FIG. 14.

At block 1401, the method 1400 begins.

At block 1410, a switch fabric packet is received. The switch fabric packet is received at the switch fabric card of the router chassis. The switch fabric packet includes a switch fabric header and a data packet.

At block 1420, the switch fabric header is parsed. The switch fabric header, in the case of an FRR-capable data packet, includes primary next-hop forwarding information and secondary next-hop forwarding information. The switch fabric header, in the case of a non-FRR-capable data packet, includes next-hop forwarding information.

At block 1430, a determination is made as to whether the data packet is FRR-capable. The determination as to whether the data packet is FRR-capable may be based on parsing of the switch fabric header to determine whether the switch fabric header includes primary next-hop forwarding information and secondary next-hop forwarding information (which indicates that the data packet is FRR-capable) or only includes next-hop forwarding information for a single possible next-hop (which indicates that the data packet is not FRR-capable). If a determination is made that the data packet is FRR capable then the method 1400 proceeds to block 1440. If a determination is made that the data packet is not FRR capable then the method 1400 proceeds to block 1450.

At block 1440, the switch fabric packet is forwarded toward the primary next-hop for the data packet. The switch fabric packet is forwarded toward the primary next-hop for the data packet by forwarding the switch fabric toward the egress forwarding card that serves the primary next-hop for the data packet.

At block 1450, the switch fabric packet is forwarded toward the next-hop for the data packet. The switch fabric packet is forwarded toward the next-hop for the data packet by forwarding the switch fabric packet toward the egress forwarding card that serves the next-hop for the data packet.

At block 1499, the method 1400 ends.

It will be appreciated that various other functions presented herein may be implemented within the context of the method 1400 of FIG. 14.

Figure 15:
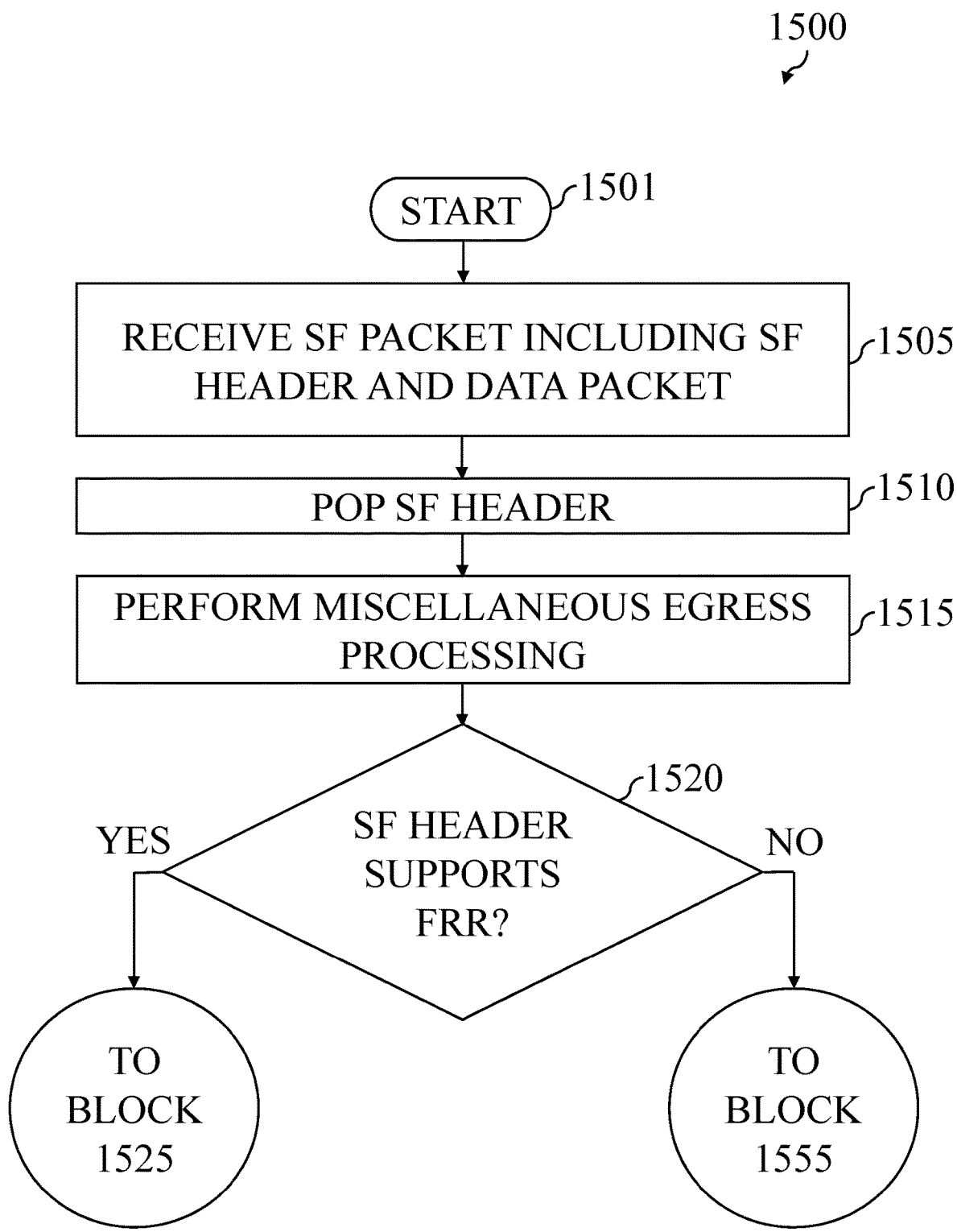
FIG. 15 depicts an example embodiment of a method for use by an egress forwarding card of a router chassis to forward a data packet where the router chassis supports egress rerouting.

FIG. 15 depicts an example embodiment of a method for use by an egress forwarding card of a router chassis to forward a data packet. It will be appreciated that, although primarily presented herein as being performed serially, at least a portion of the functions of method 1500 may be performed contemporaneously or in a different order than as presented in FIG. 15.

At block 1501, the method 1500 begins.

At block 1505, a switch fabric packet is received. The switch fabric packet is received at the switch fabric card of the router chassis. The switch fabric packet includes a switch fabric header and a data packet. From block 1505, the method 1500 proceeds to block 1510.

At block 1510, the switch fabric header is popped from the switch fabric packet. The switch fabric header information from the switch fabric header may be saved for further reference. From block 1510, the method 1500 proceeds to block 1515.

At block 1515, egress processing is performed. This may include addition of additional headers onto the data packet (e.g., depending on the packet forwarding technology, the type of next-hop, or the like, as well as various combinations thereof). From block 1515, the method 1500 proceeds to block 1520.

At block 1520, a determination is made as to whether the switch fabric header supports FRR of the data packet. This determination may include determining whether the switch fabric header includes primary next-hop forwarding information and secondary next-hop forwarding information (which indicates that the switch fabric header supports FRR of the data packet) or only includes next-hop forwarding information for a single possible next-hop (which indicates that the switch fabric header does not support FRR of the data packet). If the switch fabric header supports FRR of the data packet, then the method 1500 proceeds to block 1525. If the switch fabric header does not support FRR of the data packet, then the method 1500 proceeds to block 1555.

At block 1525, a determination is made as to whether the primary next-hop for the data packet has failed. If the primary next-hop for the data packet has failed (i.e., a FRR of the data packet is needed), then the method 1500 proceeds to block 1530. If the primary next-hop for the data packet has not failed (i.e., a FRR of the data packet is not needed), then the method 1500 proceeds to block 1550.

At block 1530, any egress encapsulations applied to the data packet for forwarding to the primary next-hop are removed from the data packet. From block 1530, the method 1500 proceeds to block 1535.

At block 1535, a new switch fabric header is added to the data packet to form a new switch fabric packet. From block 1535, the method 1500 proceeds to block 1540.

At block 1540, an indication of the secondary next-hop is encoded as the next-hop in the new switch fabric header of the new switch fabric packet. The secondary next-hop is known from being encoded in the switch fabric header of the switch fabric packet received at the egress forwarding card. It is noted that, at this point, the data packet is in-flight within the FRR switchover window as the primary next-hop failure notification has not yet been seen by the ingress forwarding card on which the data packet was originally received. From block 1540, the method 1500 proceeds to block 1545.

At block 1545, the new switch fabric packet is forwarded toward the secondary next-hop for the data packet. The switch fabric packet is forwarded toward the next-hop for the data packet by forwarding the switch fabric packet toward the egress forwarding card that serves the secondary next-hop for the data packet. From block 1545, the method 1500 proceeds to block 1599 where the method 1500 ends.

At block 1550, the data packet is forwarded toward the primary next-hop for the data packet. From block 1550, the method 1500 proceeds to block 1599 where the method 1500 ends.

At block 1555, a determination is made as to whether the primary next-hop for the data packet has failed. If the primary next-hop for the data packet has not failed, then the method 1500 proceeds to block 1560. If the primary next-hop for the data packet has failed, then the method 1500 proceeds to block 1565.

At block 1560, the data packet is forwarded toward the next-hop for the data packet. From block 1560, the method 1500 proceeds to block 1599 where the method 1500 ends.

At block 1565, the data packet is dropped. This is due to the fact that the primary next-hop has failed and the data packet has already been received at the egress forwarding card without an indication of a secondary next-hop which could have been used to provide egress rerouting of the data packet. From block 1565, the method 1500 proceeds to block 1599 where the method 1500 ends.

At block 1599, the method 1500 ends.

Figure 16:
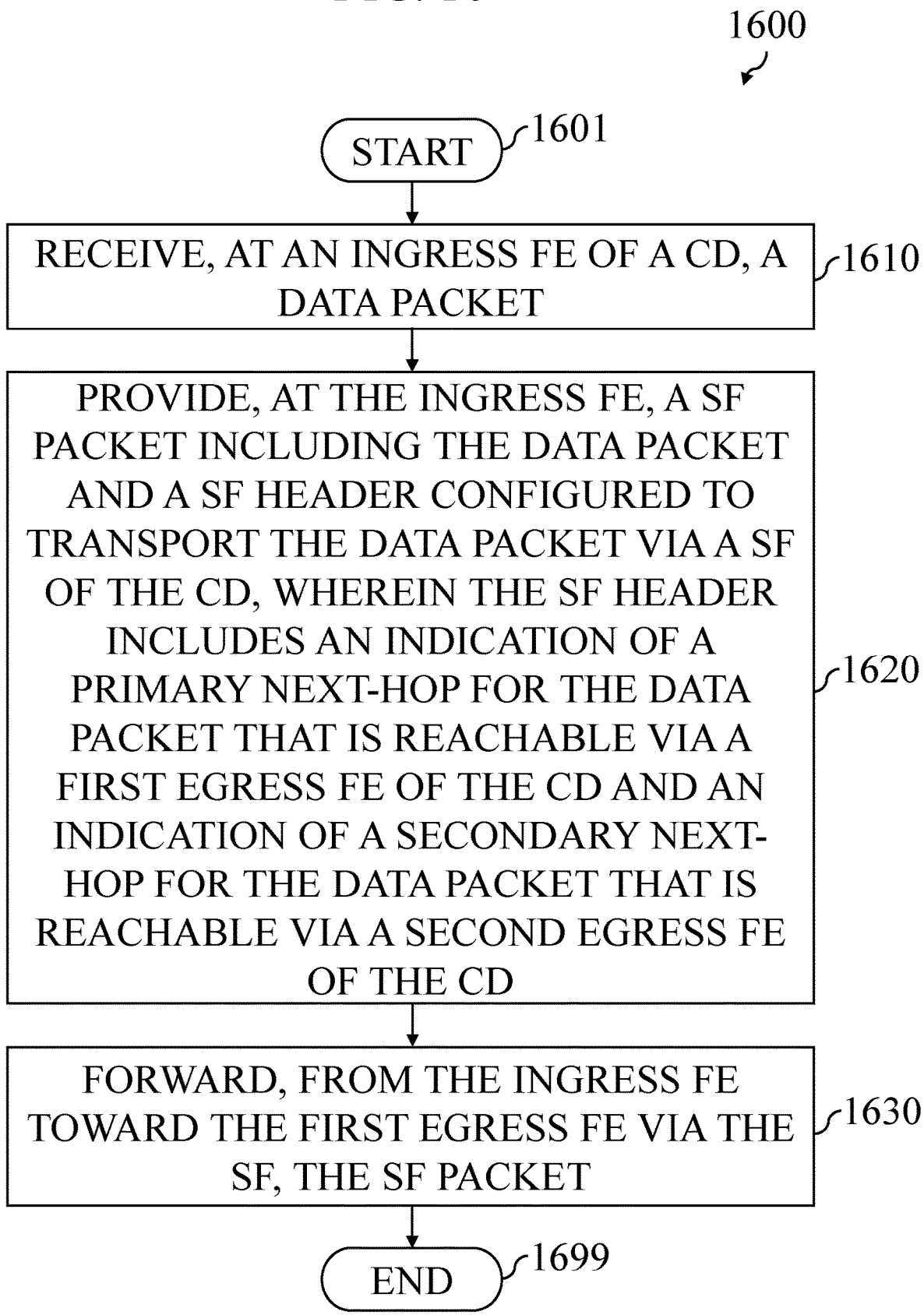
FIG. 16 depicts an example embodiment of a method for supporting egress routing of data packets.

FIG. 16 depicts an example embodiment of a method for supporting egress routing of data packets where the router chassis supports egress rerouting. It will be appreciated that, although primarily presented herein as being performed serially, at least a portion of the functions of method 1600 may be performed contemporaneously or in a different order than as presented in FIG. 16. At block 1601, the method 1600 begins. At block 1610, receive, at an ingress forwarding element of a communication device, a data packet. At block 1620, provide, at the ingress forwarding element, a switch fabric packet including the data packet and a switch fabric header configured to transport the data packet via a switch fabric of the communication device, wherein the switch fabric header includes an indication of a primary next-hop for the data packet that is reachable via a first egress forwarding element of the communication device and an indication of a secondary next-hop for the data packet that is reachable via a second egress forwarding element of the communication device. At block 1630, forward, from the ingress forwarding element toward the first egress forwarding element via the switch fabric, the switch fabric packet. At block 1699, the method 1600 ends. It will be appreciated that various other functions presented herein may be implemented within the context of the method 1600 of FIG. 16.

Figure 17:
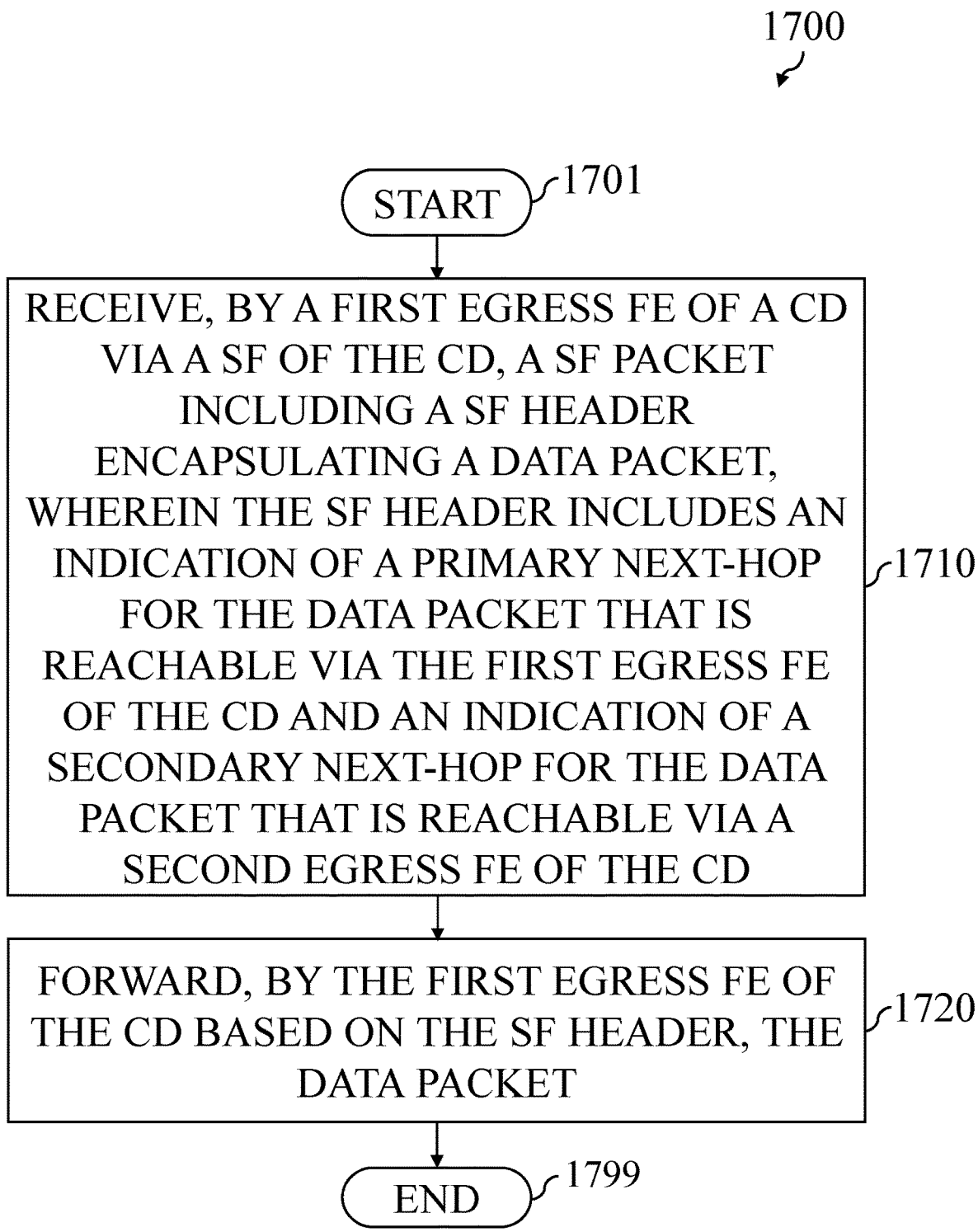
FIG. 17 depicts an example embodiment of a method for supporting egress routing of data packets.

FIG. 17 depicts an example embodiment of a method for supporting egress routing of data packets. It will be appreciated that, although primarily presented herein as being performed serially, at least a portion of the functions of method 1700 may be performed contemporaneously or in a different order than as presented in FIG. 17. At block 1701, the method 1700 begins. At block 1710, receive, by a first egress forwarding element of a communication device via a switch fabric of the communication device, a switch fabric packet including a switch fabric header encapsulating a data packet, wherein the switch fabric header includes an indication of a primary next-hop for the data packet that is reachable via the first egress forwarding element of the communication device and an indication of a secondary next-hop for the data packet that is reachable via a second egress forwarding element of the communication device. At block 1720, forward, by the first egress forwarding element of the communication device based on the switch fabric header, the data packet. At block 1799, the method 1700 ends. It will be appreciated that various other functions presented herein may be implemented within the context of the method 1700 of FIG. 17.

Figure 18:
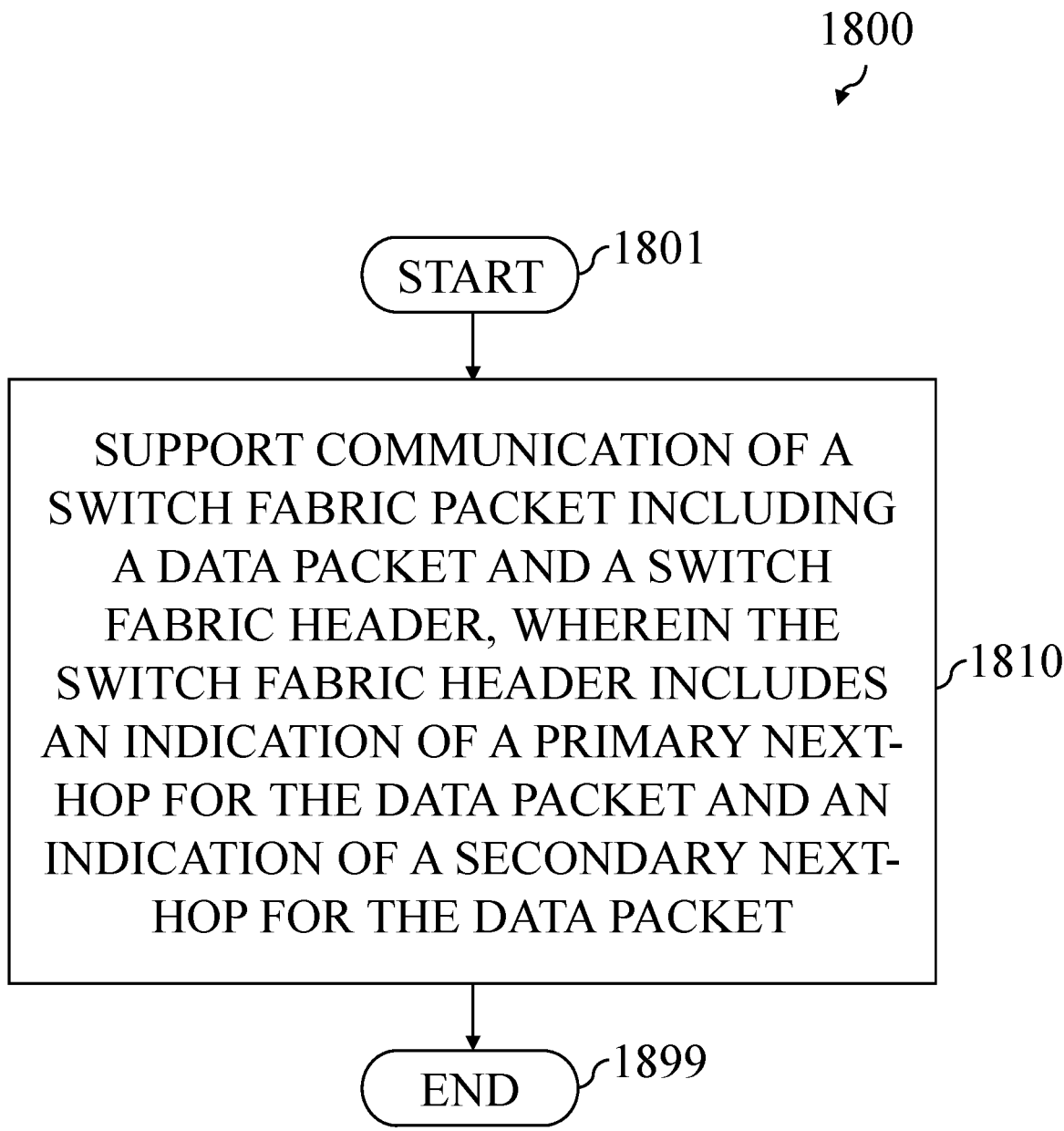
FIG. 18 depicts an example embodiment of a method for supporting egress rerouting of a data packet at a communication device.

FIG. 18 depicts an example embodiment of a method for supporting egress rerouting of a data packet at a communication device. It will be appreciated that, although primarily presented herein as being performed serially, at least a portion of the functions of method 1800 may be performed contemporaneously or in a different order than as presented in FIG. 18. At block 1801, the method 1800 begins. At block 1810, support communication of a switch fabric packet including a data packet and a switch fabric header, wherein the switch fabric header includes an indication of a primary next-hop for the data packet and an indication of a secondary next-hop for the data packet. At block 1899, the method 1800 ends. It will be appreciated that various other functions presented herein may be implemented within the context of the method 1800 of FIG. 18.

It will be appreciated that, although primarily presented herein with respect to example embodiments in which egress rerouting of a data packet at a communication device includes rerouting the data packet from a first egress forwarding element of the communication device to a second egress forwarding element of the communication device, in at least some example embodiments egress rerouting of a data packet at a communication device may include rerouting the data packet at the egress forwarding element by rerouting the data packet from a first transceiver of the egress forwarding element associated with the primary next-hop for the data packet to a second transceiver of the egress forwarding element associated with the secondary next-hop for the data packet.

Various example embodiments for supporting egress rerouting of data packets in communication devices may provide various advantages or potential advantages. For example, various example embodiments for supporting egress rerouting of data packets in communication devices may be configured to reduce the number of packets dropped during a fast reroute operation. Various example embodiments for supporting egress rerouting of data packets in communication devices may provide various other advantages or potential advantages.

Figure 19:
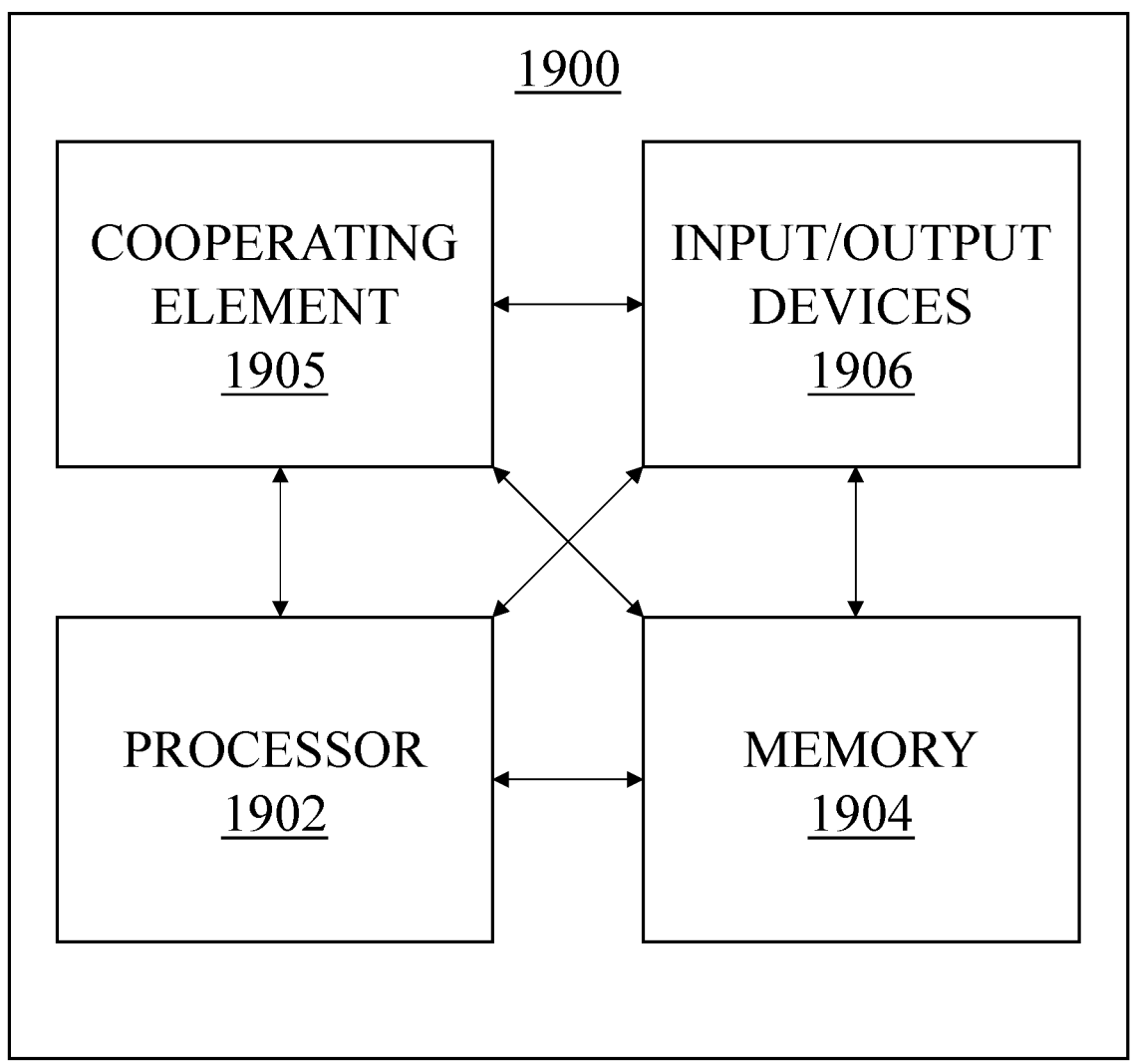
FIG. 19 depicts an example embodiment of a computer suitable for use in performing various functions presented herein.

FIG. 19 depicts an example embodiment of a computer suitable for use in performing various functions presented herein.

The computer 1900 includes a processor 1902 (e.g., a central processing unit (CPU), a processor, a processor having a set of processor cores, a processor core of a processor, or the like) and a memory 1904 (e.g., a random access memory (RAM), a read-only memory (ROM), or the like). In at least some example embodiments, the computer 1900 may include at least one processor and at least one memory storing instructions that, when executed by the at least one processor, cause the computer to perform various functions presented herein.

The computer 1900 also may include a cooperating element 1905. The cooperating element 1905 may be a hardware device. The cooperating element 1905 may be a process that can be loaded into the memory 1904 and executed by the processor 1902 to implement various functions presented herein (in which case, for example, the cooperating element 1905 (including associated data structures) can be stored on a non-transitory computer readable medium, such as a storage device or other suitable type of storage element (e.g., a magnetic drive, an optical drive, or the like)).

The computer 1900 also may include one or more input/output devices 1906. The input/output devices 1906 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 1900 may represent a general architecture and functionality suitable for implementing functional elements described herein, portions of functional elements described herein, or the like, as well as various combinations thereof. For example, the computer 1900 may provide a general architecture and functionality that is suitable for implementing one or more elements presented herein. For example, the computer 1900 may provide a general architecture and functionality that is suitable for implementing a router chassis or a portion thereof, a control card or a portion thereof, a forwarding card or a portion thereof, a switch fabric card or a portion thereof, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer readable media), transmitted via a data stream in a broadcast or other signal bearing medium, and/or stored within a memory within a computing device operating according to the instructions.

It will be appreciated that the term "non-transitory" as used herein is a limitation of the medium itself (i.e., tangible, not a signal) as opposed to a limitation of data storage persistency (e.g., RAM versus ROM).

It will be appreciated that, as used herein, "at least one of <a list of two or more elements>" and "at least one of the following: <a list of two or more elements>" and similar wording, where the list of two or more elements are joined by "and" or "or", mean at least any one of the elements, or at least any two or more of the elements, or at least all the elements.

It will be appreciated that, as used herein, the term "or" refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
at least one processor; and
at least one memory storing instructions which, when executed by the at least one processor, cause the apparatus at least to:
receive, by a first egress forwarding element of a communication device via a switch fabric of the communication device, a switch fabric packet including a switch fabric header encapsulating a data packet, wherein the switch fabric header includes an indication of a primary next-hop for the data packet that is reachable via the first egress forwarding element of the communication device and an indication of a secondary next-hop for the data packet that is reachable via a second egress forwarding element of the communication device; and
forward, by the first egress forwarding element of the communication device based on the switch fabric header, the data packet.

2. The apparatus of claim 1, wherein the indication of the primary next-hop for the data packet includes an address of the primary next-hop for the data packet, an identifier of the first egress forwarding element, and an identifier of a port of the first egress forwarding element associated with the primary next-hop for the data packet.

3. The apparatus of claim 1, wherein the indication of the secondary next-hop for the data packet includes an address of the secondary next-hop for the data packet, an identifier of the second egress forwarding element, and an identifier of a port of the second egress forwarding element associated with the secondary next-hop for the data packet.

4. The apparatus of claim 1, wherein the switch fabric packet is received from an ingress forwarding element via which the data packet arrived at the communication device.

5. The apparatus of claim 1, wherein, to forward the data packet, the instructions, when executed by the at least one processor, cause the apparatus at least to:
forward, by the first egress forwarding element of the communication device based on a determination that the primary next-hop is reachable, the data packet from the first egress forwarding element of the communication device toward the primary next-hop.

6. The apparatus of claim 1, wherein, to forward the data packet, the instructions, when executed by the at least one processor, cause the apparatus at least to:
reroute, by the first egress forwarding element of the communication device based on a determination to reroute the data packet from the primary next-hop to the secondary next-hop, the data packet from the first egress forwarding element of the communication device toward the second egress forwarding element of the communication device.

7. The apparatus of claim 6, wherein the determination to reroute the data packet from the primary next-hop to the secondary next-hop is based on identification of a failure associated with the primary next-hop for the data packet.

8. The apparatus of claim 6, wherein, to reroute the data packet, the instructions, when executed by the at least one processor, cause the apparatus at least to:
send, by the first egress forwarding element toward the second egress forwarding element via the switch fabric, the data packet.

9. The apparatus of claim 6, wherein, to reroute the data packet, the instructions, when executed by the at least one processor, cause the apparatus at least to:
form, by the first egress forwarding element, a second switch fabric packet including a second switch fabric header encapsulating the data packet, wherein the second switch fabric header includes the indication of the secondary next-hop for the data packet; and
forward, by the first egress forwarding element via the switch fabric, the second switch fabric packet.

10. The apparatus of claim 9, wherein the indication of the secondary next-hop for the data packet includes an address of the secondary next-hop for the data packet, an identifier of the second egress forwarding element, and an identifier of a port of the second egress forwarding element associated with the secondary next-hop for the data packet.

11. The apparatus of claim 1, wherein the switch fabric packet is received by a packet processor of the first egress forwarding element and the data packet is forwarded by the packet processor of the first egress forwarding element.

12. A method, comprising:
receiving, by a first egress forwarding element of a communication device via a switch fabric of the communication device, a switch fabric packet including a switch fabric header encapsulating a data packet, wherein the switch fabric header includes an indication of a primary next-hop for the data packet that is reachable via the first egress forwarding element of the communication device and an indication of a secondary next-hop for the data packet that is reachable via a second egress forwarding element of the communication device; and
forwarding, by the first egress forwarding element of the communication device based on the switch fabric header, the data packet.

13. An apparatus, comprising:
at least one processor; and
at least one memory storing instructions which, when executed by the at least one processor, cause the apparatus at least to:
receive, at an ingress forwarding element of a communication device, a data packet;
provide, at the ingress forwarding element of the communication device, a switch fabric packet including the data packet and including a switch fabric header configured to transport the data packet via a switch fabric of the communication device, wherein the switch fabric header includes an indication of a primary next-hop for the data packet that is reachable via a first egress forwarding element of the communication device and an indication of a secondary next-hop for the data packet that is reachable via a second egress forwarding element of the communication device; and
forward, from the ingress forwarding element toward the first egress forwarding element of the communication device via the switch fabric, the switch fabric packet.

14. The apparatus of claim 13, wherein the instructions, when executed by the at least one processor, cause the apparatus at least to:
determine, by the ingress forwarding element of the communication device, that egress rerouting is to be supported for the data packet.

15. The apparatus of claim 13, wherein the primary next-hop for the data packet and the secondary next-hop for the data packet are determined from a table maintained on a packet processor of the ingress forwarding element of the communication device.

16. The apparatus of claim 13, wherein the primary next-hop for the data packet and the secondary next-hop for the data packet are determined from source routing information of the data packet.

17. The apparatus of claim 13, wherein the indication of the primary next-hop for the data packet includes an address of the primary next-hop for the data packet, an identifier of the first egress forwarding element, and an identifier of a port of the first egress forwarding element associated with the primary next-hop for the data packet.

18. The apparatus of claim 13, wherein the indication of the secondary next-hop for the data packet includes an address of the secondary next-hop for the data packet, an identifier of the second egress forwarding element, and an identifier of a port of the second egress forwarding element associated with the secondary next-hop for the data packet.

19. The apparatus of claim 13, wherein the instructions, when executed by the at least one processor, cause the apparatus at least to:
receive, at the ingress forwarding element of the communication device, an indication of a failure associated with the primary next-hop for the data packet;
receive, at the ingress forwarding element of the communication device, a second data packet belonging to a data flow of the data packet;
provide, at the ingress forwarding element of the communication device, a second switch fabric packet including the second data packet and a second switch fabric header configured to transport the data packet via the switch fabric of the communication device, wherein the second switch fabric header includes an indication of the secondary next-hop that is reachable via the second egress forwarding element of the communication device; and
forward, from the ingress forwarding element of the communication device toward the second egress forwarding element of the communication device via the switch fabric, the second switch fabric packet.

20. A method, comprising:
receiving, at an ingress forwarding element of a communication device, a data packet;

providing, at the ingress forwarding element of the communication device, a switch fabric packet including the data packet and including a switch fabric header configured to transport the data packet via a switch fabric of the communication device, wherein the switch fabric header includes an indication of a primary next-hop for the data packet that is reachable via a first egress forwarding element of the communication device and an indication of a secondary next-hop for the data packet that is reachable via a second egress forwarding element of the communication device; and forwarding, from the ingress forwarding element toward the first egress forwarding element of the communication device via the switch fabric, the switch fabric packet.

* * * * *